(12) United States Patent
Lee

(10) Patent No.: US 12,447,245 B2
(45) Date of Patent: Oct. 21, 2025

(54) BODY FLUID COMPONENT SEPARATING DEVICE

(71) Applicant: Jun Seok Lee, Busan (KR)

(72) Inventor: Jun Seok Lee, Busan (KR)

( * ) Notice: Subject to any disclaimer, the term of this patent is extended or adjusted under 35 U.S.C. 154(b) by 776 days.

(21) Appl. No.: 17/430,052

(22) PCT Filed: Oct. 28, 2020

(86) PCT No.: PCT/KR2020/014769
§ 371 (c)(1),
(2) Date: Aug. 11, 2021

(87) PCT Pub. No.: WO2021/096107
PCT Pub. Date: May 20, 2021

(65) Prior Publication Data
US 2022/0133962 A1  May 5, 2022

(30) Foreign Application Priority Data

Nov. 11, 2019  (KR) .................. 10-2019-0143458
Aug. 27, 2020  (KR) .................. 10-2020-0108311

(51) Int. Cl.
*A61M 1/02* (2006.01)
*B01L 3/00* (2006.01)

(52) U.S. Cl.
CPC ........... *A61M 1/029* (2013.01); *B01L 3/5021* (2013.01); *A61M 2202/0415* (2013.01);
(Continued)

(58) Field of Classification Search
CPC ............ A61M 1/029; B01L 2400/0478; B01L 2400/0481; B01L 3/5021
See application file for complete search history.

(56) References Cited

U.S. PATENT DOCUMENTS

2003/0205538 A1   11/2003   Dorian et al.
2006/0278588 A1*  12/2006   Woodell-May ...... G01N 33/491
                                                                 604/82
(Continued)

FOREIGN PATENT DOCUMENTS

KR   10-2011-0120729 A   11/2011
KR   10-2014-0017230 A    2/2014
(Continued)

OTHER PUBLICATIONS

International Search Report dated Feb. 26, 2021, issued in counterpart International Application No. PCT/KR2020/014769 (2 pages).

*Primary Examiner* — Ryan B Huang
(74) *Attorney, Agent, or Firm* — WHDA, LLP

(57) ABSTRACT

A body fluid component separating device according to an embodiment may comprise: a housing; a piston which divides the housing into a first space and a second space and connects the first space and the second space via fluid-connection; and a manipulator which is coupled to the piston to be operable and is configured to maintain a pressure balance between the first space and the second space, adjust movement of the piston between a first location at which the first space has a first volume and a second location at which the first space has a second volume that is different from the first volume, and fix the piston on an arbitrary location between the first location and the second location.

7 Claims, 23 Drawing Sheets

(52) U.S. Cl.
CPC . *A61M 2202/0427* (2013.01); *A61M 2202/10* (2013.01); *B01L 2300/0681* (2013.01); *B01L 2300/0832* (2013.01); *B01L 2400/0478* (2013.01)

(56) References Cited

U.S. PATENT DOCUMENTS

| | | | |
|---|---|---|---|
| 2009/0238725 A1 * | 9/2009 | Ellis | B01L 3/502 29/700 |
| 2013/0270173 A1 | 10/2013 | Tortorella et al. | |

FOREIGN PATENT DOCUMENTS

| | | | | |
|---|---|---|---|---|
| KR | 10-2014-0114165 A | 9/2014 | | |
| KR | 10-2016-0125850 A | 11/2016 | | |
| KR | 10-2018-0009602 A | 1/2018 | | |
| KR | 10-2019-0026585 A | 3/2019 | | |
| KR | 10-2019-0059019 A | 5/2019 | | |
| KR | 10-2019-0092105 A | 8/2019 | | |
| WO | 2012/085006 A1 | 6/2012 | | |
| WO | WO-2013141436 A1 * | 9/2013 | | A61J 1/05 |
| WO | WO-2013150432 A1 * | 10/2013 | | B01L 3/50215 |

* cited by examiner

BODY FLUID COMPONENT SEPARATING DEVICE

TECHNICAL FIELD

The following example embodiments relate to a body fluid component separating device.

BACKGROUND ART

Human body fluids, such as blood and bone marrow, contain various active ingredients and cells. Among them, plasma contained in the blood is a neutral yellow liquid component obtained by separating and removing red blood cells from the blood. Platelet-rich plasma (PRP) obtained by centrifuging plasma performs various functions, for example, a function of glue in vivo, a function for blood coagulation and hemostasis, a function of a scaffold for migration and differentiation of stem cells and primary cells, angiogenesis regulation, an anti-inflammatory action, an antibacterial action, an analgesic action, and the like. In particular, since the PRP is related to tissue regeneration such as cell proliferation, differentiation promotion, and angiogenesis in tendons, ligaments, cartilages, and muscles, the clinical utility of the PRP is attracting attention for musculoskeletal injuries. For example, Korean Patent Publication No. 10-2019-0059019 discloses a device for centrifuging blood components.

DETAILED DESCRIPTION OF THE INVENTION

Technical Goals

An aspect is to provide a body fluid component separating device that may move a piston downward while maintaining a pressure balance between an upper space of the piston and a lower space of the piston, regardless of an external force that causes the piston to move downward, so that a pressure of the lower space of the piston increases and that a pressure of the upper space of the piston decreases when the piston descends.

An aspect is to provide a body fluid component separating device that may set a piston to be fixed so that a target body fluid to be separated has an arbitrary capacity, by adjusting an initial position of the piston according to the capacity.

Technical Solutions

According to an example embodiment, a body fluid component separating device includes: a housing; a piston that is accommodated in the housing and that is configured to divide the housing into a first space and a second space and to fluidly connect the first space and the second space; and a manipulator that is operably coupled to the piston and that is configured to adjust a movement of the piston between a first location in which the first space has a first volume and a second location in which the first space has a second volume different from the first volume while maintaining a pressure balance between the first space and the second space, and configured to fix the piston at an arbitrary location between the first location and the second location.

The manipulator may include: a shaft having a longitudinal axis; a male engagement element formed on the shaft; and a female engagement element engaged with the male engagement element and fixedly installed to the piston.

The manipulator may include: a handle including a first engagement member; and a second engagement member connected to the shaft and engaged with the first engagement member.

The device may further include an indicator configured to fluidly connect the first space and the second space and to indicate a layer including a target material flowing from the first space to the second space.

The indicator may include: a tube including an inlet port, an outlet port, and a main channel defined between the inlet port and the outlet port; and an insert disposed inside the tube and on the main channel, and configured to define a sub-channel having a cross section less than a cross section of the main channel together with the tube.

The insert may include a guide portion to guide a fluid flowing through the main channel to the sub-channel.

The device may further include a filter structure configured to fluidly connect the first space and the second space and to filter a fluid flowing from the first space to the second space.

The filter structure may include a filter housing having an inlet port fluidly connected to the first space, a first outlet port fluidly connected to the second space, and a second outlet port fluidly connected to the second space and disposed opposite the first outlet port; a first filter installed in the first outlet port; and a second filter installed in the second outlet port.

The filter structure may include a tube that includes a first end portion fluidly connected to the first space, a second end portion fluidly connected to the inlet port of the filter housing, and a longitudinal portion extending between the first end portion and the second end portion. The second end portion of the tube may protrude from an inner wall of the filter housing toward an inside of the filter housing.

The piston may include an outer body moving along the housing; an inner body located inside the outer body; a partition configured to connect an end portion of the outer body and an end portion of the inner body and configured to partition an interior of the housing into the first space and the second space; and a fluid passage extending between the outer body and the inner body and from the partition and configured to fluidly connect the first space and the second space.

The partition may include a groove to receive a target material.

According to an example embodiment, a piston is a piston for a body fluid component separating device and includes: an outer body; an inner body disposed inside the outer body and configured to define an inner space together with the outer body; a partition configured to connect the outer body and the inner body and configured to separate an outer space and an inner space of the outer body; and a fluid passage extending in the inner space and from the partition and configured to fluidly connect the inner space and an outside of the outer body.

Effects of the Invention

According to an example embodiment, a body fluid component separating device may move a piston downward while maintaining a pressure balance between an upper space of the piston and a lower space of the piston, regardless of an external force that causes the piston to move downward, so that a pressure of the lower space of the piston increases and that a pressure of the upper space of the piston decreases when the piston descends.

According to an example embodiment, a body fluid component separating device may set a piston to be fixed so that a target body fluid to be separated has an arbitrary capacity, by adjusting an initial position of the piston according to the capacity.

The effects of the body fluid component separating device are not limited to the above-mentioned effects, and other unmentioned effects can be clearly understood from the following description by one of ordinary skill in the art.

BEST MODE FOR CARRYING OUT THE INVENTION

Figure 1:
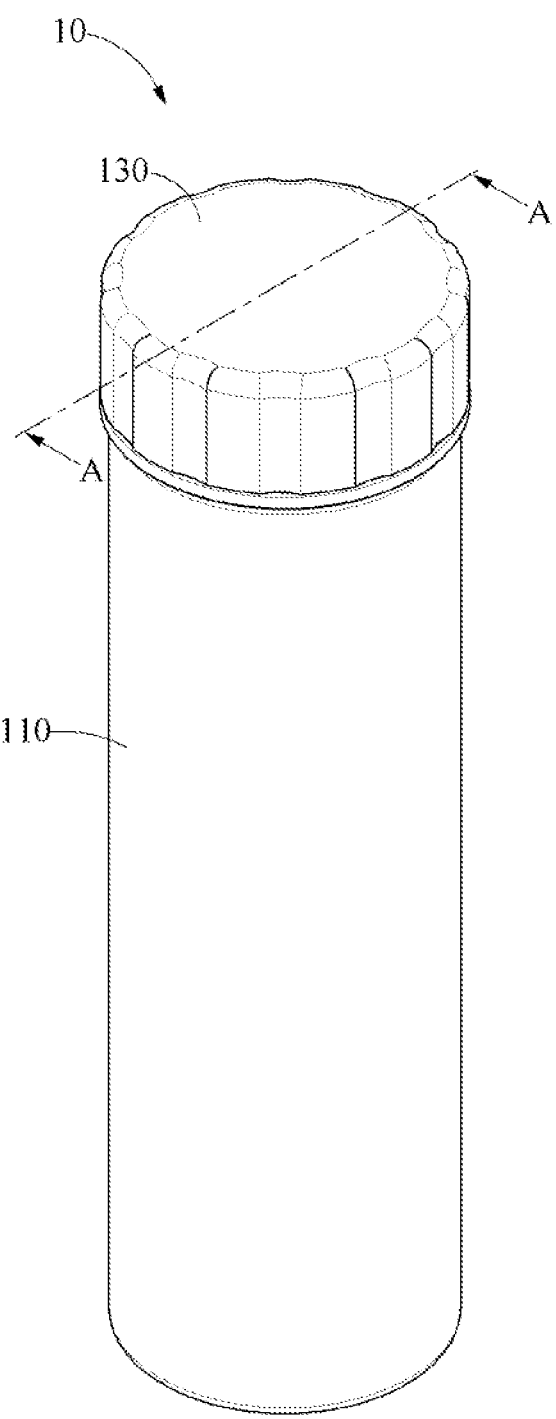
FIG. 1 is a perspective view of a body fluid component separating device according to a first example embodiment.
Figure 2:
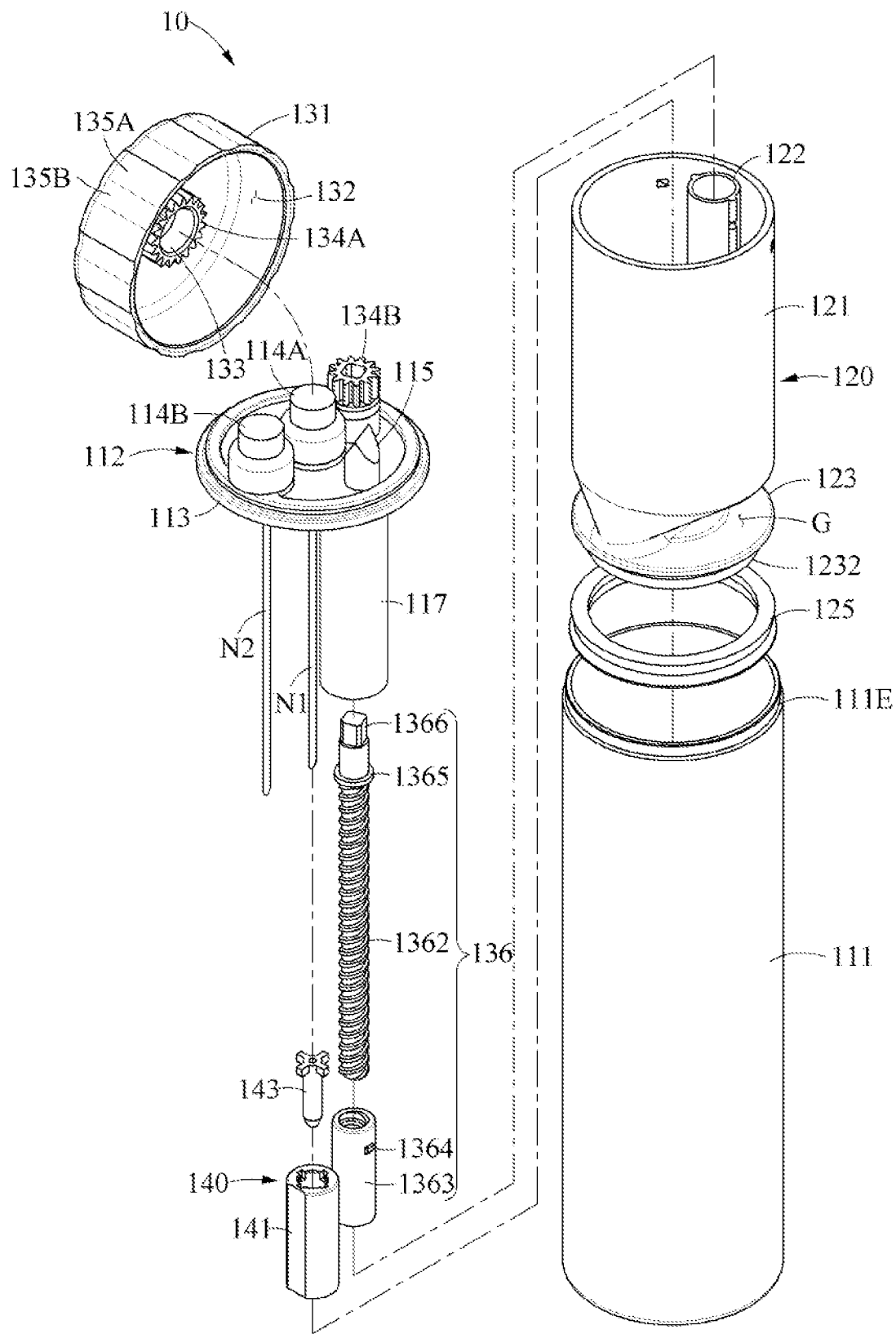
FIG. 2 is an exploded perspective view of the body fluid component separating device according to the first example embodiment.
Figure 3:
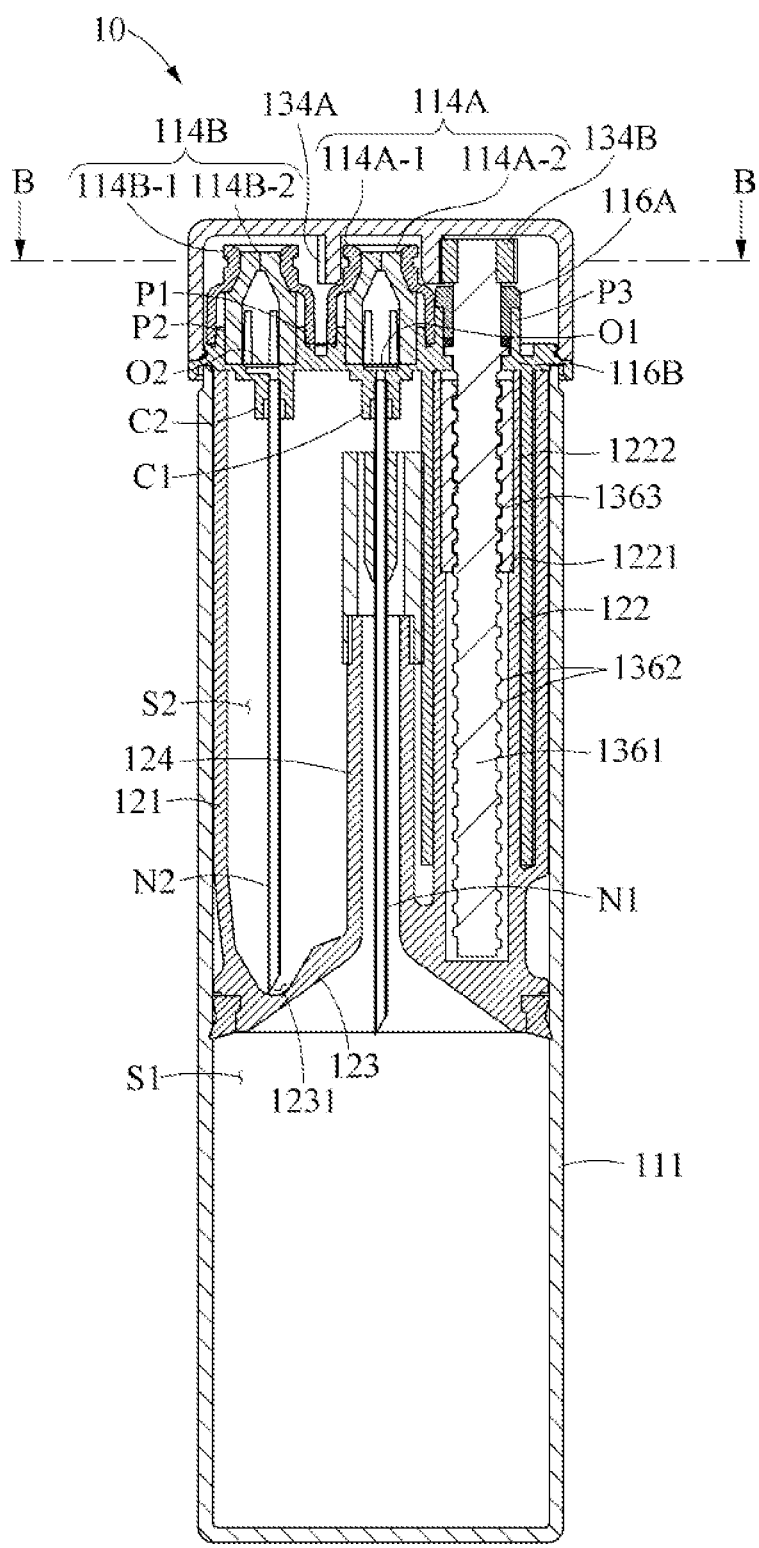
FIG. 3 is a cross-sectional view of the body fluid component separating device of FIG. 1, taken along line A-A.
Figure 4:
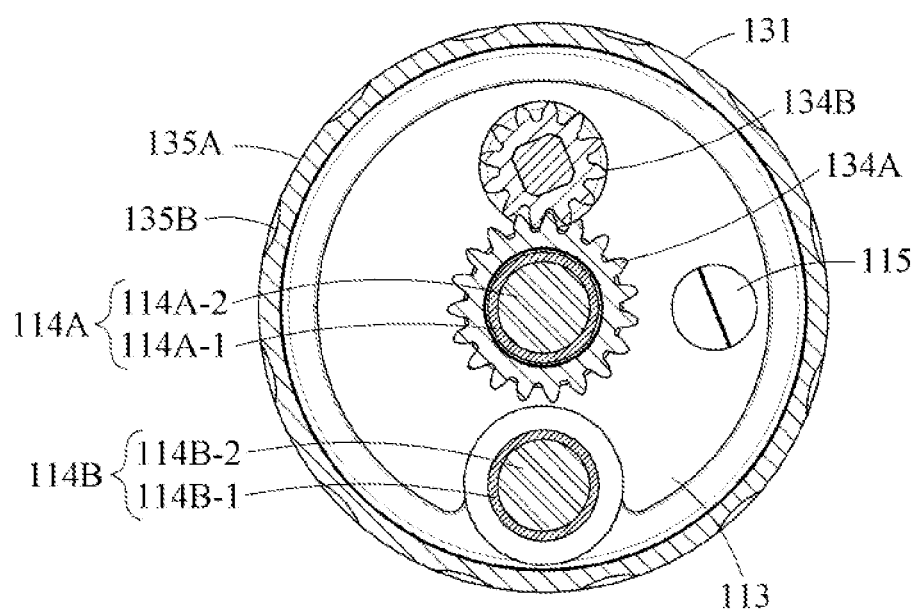
FIG. 4 is a cross-sectional view of the body fluid component separating device of FIG. 3, viewed from line B-B.
Figure 5:
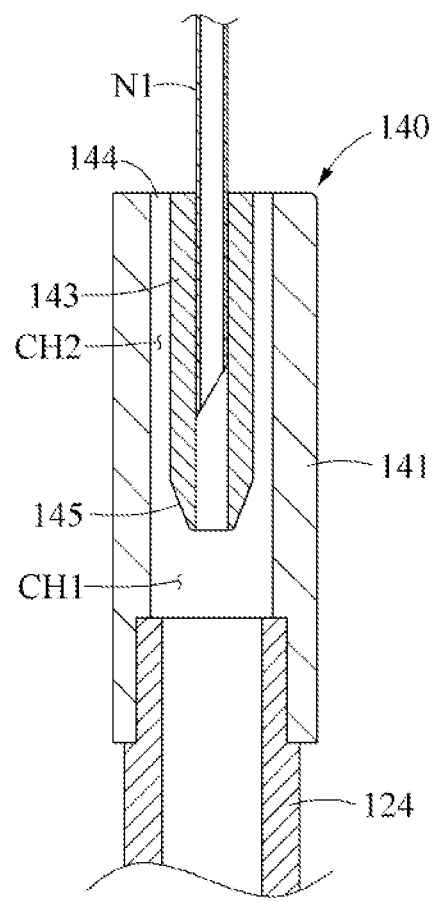
FIG. 5 is an enlarged view of an indicator of the body fluid component separating device of FIG. 3.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The constituent element, which has the same common function as the constituent element included in any one embodiment, will be described by using the same name in other example embodiments. Unless disclosed to the contrary, the configuration disclosed in any one example embodiment may be applied to other example embodiments, and the specific description of the repeated configuration will be omitted.

Referring to FIGS. 1 to 5, a body fluid component separating device 10 according to an example embodiment may separate platelet-rich plasma (PRP) and bone-marrow cell concentrate (BMC) that are target materials from a target body fluid to be separated. For example, the body fluid component separating device 10 may separate a fluid into a plurality of layers using centrifugation, and may extract the PRP and the BMC from a buffy coat layer among the plurality of layers. The body fluid component separating to device 10 may include a housing 110, a piston 120, a manipulator 130, and an indicator 140.

The housing 110 may accommodate the piston 120, at least a portion of the manipulator 130, and the indicator 140. The housing 110 may include a container 111 and a lid 112. The container 111 and the lid 112 may define a space sealed against the outside.

The container 111 may have an elongated cylindrical shape. Also, the container 111 may have an open upper end portion, a closed side portion, and a closed lower end portion. The container 111 may have a step 111E recessed in a radial direction of the container 111 at the open upper end portion.

The container 111 may be formed of a substantially transparent material or a substantially translucent material so that the inside of the container 111 may be seen from the outside of the container 111. A user may check an amount of the target body fluid in the container 111, a movement of a material of a plurality of layers obtained by separating the body fluid, and the like.

The lid 112 may seal the open upper end portion of the container 111. The lid 112 may include a sealing plate 113, a first plug 114A, a second plug 114B, a check valve 115, a sealing cap 116A, a sealing ring 116B, and a piston guide 117.

The sealing plate 113 may cover the open upper end portion of the container 111. The sealing plate 113 may have a substantially disk shape. The sealing plate 113 may be coupled to the step 111E of the container 111 in the open upper end portion of the container 111.

The sealing plate 113 may include the first plug 114A and the second plug 114B that may be in fluid communication. In an example, the target body fluid may be accommodated in the container 111 through the first plug 114A and a first opening O1. In another example, a portion of materials accommodated in the container 111 may be removed out of the container 111 through the first plug 114A and the first opening O1. Also, a target material accommodated in a second space S2 may be extracted through the second plug 114B. The first opening O1 may be formed in a central portion of the sealing plate 113, and a second opening O2 may be formed in a peripheral portion of the sealing plate 113.

The sealing plate 113 may include a first annular protrusion P1 formed around the first opening O1 and protruding away from the container 111, and a first needle coupling portion C1 formed around the first opening O1 and protruding toward the inside of the container 111. In addition, the sealing plate 113 may include a second protrusion P2 formed around the second opening O2 and protruding away from the container 111, and a second needle coupling portion C2 formed around the second opening O2 and protruding toward the inside of the container 111. A first needle N1 may be configured to inject a target fluid to be separated into the container 111, and may be coupled to the first needle coupling part C1. Also, the first needle N1 may be used to remove a portion of materials contained in the container 111 out of the container 111. A second needle N2 may be configured to extract the target material contained in the second space S2, and may be coupled to the second needle coupling portion C2.

The first plug 114A may open and close the first opening O1. The first plug 114A may include a first screw thread 114A-1 that may be coupled to an external unit such as a syringe, at one end thereof, and may accommodate a first sealing member 114A-2. The first sealing member 114A-2 may substantially open and close the first opening O1. The first plug 114A may be removably coupled to the first annular protrusion P1.

The second plug 114B may open and close the second opening O2. The second plug 114B may include a second screw thread 114B-1 that may be coupled to an external unit such as a syringe, at one end thereof, and may accommodate a second sealing member 114B-2. The second plug 114B may be removably coupled to the second annular protrusion P2.

The first sealing member 114A-2 and/or the second sealing member 114B-2 may be formed of soft materials such as silicone. In an example, when the first plug 114A and/or the second plug 114B are coupled to the external unit, the first sealing member 114A-2 and/or the second sealing member 114B-2 may be deformed, and the first opening O1 and/or the second opening O2 may be opened. In another example, when the first plug 114A and/or the second plug 114B are separated from the external unit, the deformed first sealing member 114A-2 and/or the deformed second sealing member 114B-2 may return to the original shape, and the first opening O1 and/or the second opening O2 may be closed again.

The check valve 115 may block a flow of a fluid (e.g., air) from the outside of the container 111 into the inside of the container 111, but may allow a fluid contained in the container 111 to flow out of the container 111. The check valve 115 may be disposed in the peripheral portion of the sealing plate 113.

The sealing cap 116A and the sealing ring 116B may seal a coupling portion between the sealing plate 113 and an adjusting portion 136 of the manipulator 130 which will be described below. The sealing plate 113 may include a third annular protrusion P3 that encloses a portion of a shaft 1361 of the adjusting portion 136 and that protrudes away from the container 111, and the sealing cap 116A and the sealing ring 116B may be interposed between the third annular protrusion P3 and the shaft 1361.

The piston guide 117 may guide a movement of the piston 120. The piston guide 117 may extend to be elongated from a position of the third annular protrusion P3 of the sealing plate 113 toward the inside of the container 111.

The piston 120 may be accommodated in the container 111 and may move in a longitudinal direction of the container 111 along an inner surface of the container 111. The piston 120 may include an outer body 121, an inner body 122, a partition 123, a fluid passage 124, and a piston sealing ring 125.

The inner body 122 may be disposed inside the outer body 121. Each of the outer body 121 and the inner body 122 may have a cylindrical shape. Accordingly, an annular space may be substantially defined between the outer body 121 and the inner body 122. The second space S2 may include an annular space defined by the outer body 121 and the inner body 122 as described above. The piston guide 117 may be disposed in the annular space between the outer body 121 and the inner body 122. At least a portion of an outer surface of the inner body 122 may substantially contact the piston guide 117. When the piston 120 moves in the longitudinal direction of the container 111, the inner body 122 of the piston 120 may move along the piston guide 117.

The inner body 122 may include a first longitudinal portion 1221 having a first diameter, and a second longitudinal portion 1222 connected to the first longitudinal portion 1221 and having a second diameter. The first diameter of the first longitudinal portion 1221 may be less than the second diameter of the second longitudinal portion 1222. Accordingly, a step may be formed between the first longitudinal portion 1221 and the second longitudinal portion 1222.

The partition 123 may connect the outer body 121 and the inner body 122, and may partition the sealed space of the housing 110 defined by the container 111 and the lid 112 into the first space S1 and the second space S2. For example, the first space S1 may refer to a lower space of the container 111 separated by the partition 123, and the second space S2 may refer to an upper space of the container 111 and an interior of the piston 120 separated by the partition 123. The partition 123 may connect a lower end portion of the outer body 121 and a lower end portion of the inner body 122. Also, the partition 123 may have a shape of a truncated cone with a diameter decreasing from the outside to the inside.

The partition 123 may include a groove 1231 to receive at least one material in the second space S2. Here, the groove 1231 may be formed at a lowest position of the partition 123 formed to be substantially inclined, and may have a shape with a width narrowed in a thickness direction of the partition 123.

The partition 123 may include a sealing recess 1232 formed in a radial direction of the piston 120. The piston sealing ring 125 may be engaged with the sealing recess 1232 to maintain a seal between the piston 120 and the container 111.

The fluid passage 124 may fluidly connect the first space S1 and the second space S2. Since the partition 123 partitions the sealed space of the housing 110 into the first space S1 and the second space S2, the first space S1 and the second space S2 may fluidly communicate through the fluid passage 124. The fluid passage 124 may extend between the outer body 121 and the inner body 122 and from the partition 123. An extended length of the fluid passage 124 may be less than a length of the outer body 121 and a length of the inner body 122. Meanwhile, the fluid passage 124 may accommodate the first needle N1. The first needle N1 may fluidly connect the first opening O1 and the first space S1 through the fluid passage 124.

Meanwhile, the partition 123 may connect the outer body 121 and the inner body 122 to the fluid passage 124. For example, when the piston 120 is viewed in a first radial direction, the partition 123 may have a shape converged toward a lower end portion of the fluid passage 124 from the lower end portion of the outer body 121. When the piston 120 is viewed in a second radial direction intersecting the first radial direction, the partition 123 may have a shape diverged from the lower end portion of the fluid passage 124 toward the lower end portion of the outer body 121. In other words, the partition 123 may have an upper portion that is substantially inclined and that connects the outer body 121 and the inner body 122 to the fluid passage 124, and a lower portion that is substantially inclined and that extends from an end portion of the fluid passage 124 away from the upper portion, and a gap G may be formed between the upper portion and the lower portion.

The manipulator 130 may move the piston 120 relatively with respect to the housing 110. The manipulator 130 may be operably coupled to the piston 120. The expression "operably coupled" used herein may indicate that the manipulator 130 directly drives the piston 120. Desirably, the manipulator 130 may move the piston 120 while maintaining the piston 120 in a substantially steady state. This may indicate that a seal of the first space S1 and the second space S2 separated by the piston 120 is maintained against the outside, and that a balance of a pressure of the piston 120 between the first space S1 and the second space S2 is maintained. In addition, when the manipulator 130 is not operated by the male engagement element 1362 and the female engagement element 1363, the manipulator 130 may fix the position of the piston 120 with respect to the housing 110. Thus, the piston 120 may be fixed in place, even though an external force such as a centrifugal force or vibration is applied to the body fluid component separating device 10, and a volume ratio of the first space S1 and the second space S2 may be accurately determined according to a capacity of the target body fluid contained in the housing 110.

The manipulator 130 may include a handle 131, a pair of engagement members 134A and 134B, and the adjusting portion 136.

The handle 131 may be configured to be manipulated by a user. Here, the handle 131 may be manipulated by a mechanical and/or electrical mechanism in addition to a human. The handle 131 may have abase surface and a side surface 135A that define an inner space 132, and may have a substantially cylindrical shape. A plurality of concave portions 135B may be formed on the side surface 135A of the handle 131 in a circumferential direction of the handle 131. In addition, the handle 131 may include a hollow protrusion 133 protruding from the base surface that defines the inner space 132.

The hollow protrusion 133 may accommodate the first plug 114A.

The handle 131 may be rotatably coupled to the housing 110. Also, the handle 131 may be removably coupled to the housing 110.

The pair of engagement members 134A and 134B may include a first engagement member 134A formed around the hollow protrusion 133 and a second engagement member 134B operably connected to the adjusting portion 136. The first engagement member 134A and the second engagement member 134B may be operably engaged with each other. If a user rotates the handle 131 when using the body fluid component separating device 10, the first engagement member 134A, and the second engagement member 134B engaged with the first engagement member 134A may rotate together, and the adjusting portion 136 may be operated. In one example, the pair of engagement members 134A and 134B may include spur gears.

The adjusting portion 136 may finely adjust the movement of the piston 120. Also, the adjusting portion 136 may fix the piston 120 in place. The adjusting portion 136 may include the shaft 1361, the male engagement element 1362, and the female engagement element 1363.

The shaft 1361 may have a longitudinal axis and may rotate about the longitudinal axis. The shaft 1361 may include a head 1365 installed on the sealing plate 113, and a coupling portion 1366 coupled to the second engagement member 134B. The head 1365 may be placed on a top surface of the sealing plate 113, and the sealing cap 116A and the sealing ring 116B may be interposed between the shaft 1361 and the third annular projection P3, above the head 1365. The coupling portion 1366 may be located above the head 1365 and above the sealing cap 116A, and may define an upper end of the shaft 1361.

The male engagement element 1362 may be formed in a longitudinal direction of the shaft 1361 and may have a predetermined pitch. The male engagement element 1362 may be spirally formed in a portion of the shaft 1361 below the sealing plate 113. The shaft 1361 and the male engagement element 1362 may be understood to form a structure of a rigid screw. The female engagement element 1363 may be engaged with the male engagement element 1362, and may have a pitch corresponding to the pitch of the male engagement element 1362. The female engagement element 1363 may be understood to form a nut structure. The pitch of the male engagement element 1362 and the pitch of the female engagement element 1363 may be determined based on a rotation angle of the handle 131 manipulated by a user, and a movement distance of the piston 120. In addition, if the pitch is extremely high, the piston 120 may move while the shaft 1361 is being rotated by a force applied to the piston by an external force (for example, a centrifugal force). Accordingly, the pitch may be determined within an appropriate range to prevent the shaft 1361 from being rotated by the external force while minimizing a manipulation of the handle 131.

Meanwhile, the female engagement element 1363 may be accommodated and mounted in a cavity of the second longitudinal portion 1222 of the piston 120. Accordingly, the female engagement element 1363 may move together with the piston 120. For example, the female engagement element 1363 may include a projection 1364 that may be rigidly fixed to the inner body 122 of the piston 120. In addition, the female engagement element 1363 may be limited by a step between the first longitudinal portion 1221 and the second longitudinal portion 1222.

Intermeshing of the male engagement element 1362 and the female engagement element 1363 as described above may allow a user to fix the piston 120 at a desired position while ensuring a movement of the piston 120 in the steady state.

The indicator 140 may be configured to indicate a predetermined fluid flowing between the first space S1 and the second space S2. It may be understood that "indicating a fluid" by the indicator 140 includes visualizing, to a user, an amount and a flow of a buffy coat layer containing platelet-rich plasma among a plurality of layers obtained by separating the target fluid by a predetermined process.

Typically, a target fluid to be separated may be divided into a plurality of layers through a series of processing, for example, a centrifugation process. Since a buffy coat layer among the plurality of layers contains a relatively small amount of platelet-rich plasma in comparison to other components, the buffy coat layer may be extremely thin. Thus, a user may need to pay considerable attention to extract the platelet-rich plasma contained in the buffy coat layer, and there is a possibility that the buffy coat layer is mixed with other layers by a user's manipulation during an extraction process. Accordingly, there is a need to more clearly show the buffy coat layer to the user to prevent mixing of the buffy coat layer by the user's manipulation.

The indicator 140 may include a tube 141 and an insert 143.

The tube 141 may have an inlet port that is connected to fluidly communicate with the fluid passage 124, and an outlet port that may fluidly communicate with the second space S2. A main channel CH1 through which a fluid may flow may be defined inside the tube 141. Also, the tube 141 may include a sheet 142 formed in the outlet port.

The insert 143 may be disposed inside the tube 141. Here, the term "insert" may be construed as merely being disposed inside the tube 141, in addition to being inserted into the tube 141 in a predetermined direction. The insert 143 may have a tubular shape, and the first needle N1 may pass through the inside of the insert 143. In addition, the insert 143 may include a radial extension 144 coupled to the seat 142.

The insert 143 may be disposed on the main channel CH1 to form a sub-channel CH2 having a flow area less than a flow area of the main channel CH1 together with the tube 141. Accordingly, when a fluid flowing through the main channel CH1 having a predetermined flow rate enters the sub-channel CH2, the fluid may have a significantly increased flow length in the sub-channel CH2, compared to the main channel CH1. For example, since a flow length of a buffy coat layer containing a significantly smaller amount of platelet-rich plasma in a target fluid to be separated is greater in the sub-channel CH2 than in the main channel CH1, a user may accurately analyze a range and a presence of the buffy coat layer.

The insert 143 may include a hollow portion to accommodate the first needle N1. The first needle N1 may penetrate the insert 143 through the hollow portion of the insert 143. The first needle N1 passing through the insert 143 may sequentially enter the fluid passage 124 and the first space S1.

The insert 143 may include a guide portion 145 to smoothly guide a flow of the fluid from the main channel CH1 to the sub-channel CH2. The guide portion 145 may be formed in an end portion of the insert 143 in an upstream portion of the sub-channel CH2. The guide portion 145 may have a tapered shape with a width that changes toward the end portion of the insert 143. For example, the guide portion 145 may be narrowed toward the end portion of the insert 143 in a longitudinal direction of the insert 143.

Hereinafter, an operation of the body fluid component separating device 10 according to an example embodiment will be described with reference to FIGS. 6 to 10. Components not shown in FIGS. 6 to 10 may be clearly understood from FIGS. 1 to 5.

Figure 6:
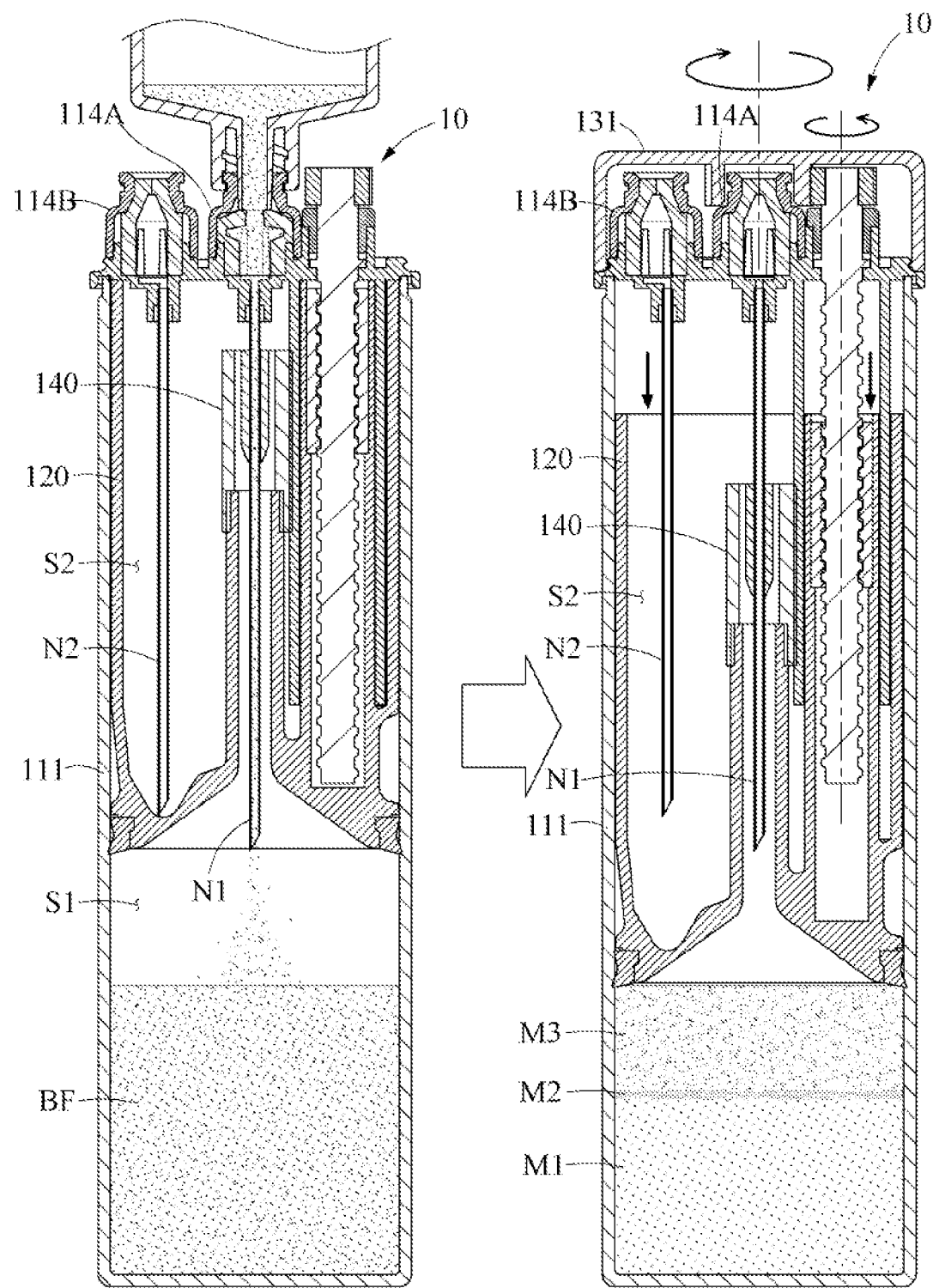
FIGS. 6 to 10 illustrate an operation of the body fluid component separating device according to the first example embodiment.

Referring to FIG. 6, in a state in which the handle 131 is removed, a user may couple the first plug 114A to an external unit (for example, a syringe) to inject blood BF or bone marrow that is a target body fluid to be separated into the first space S1 of the container 111 under the piston 120 through the first needle N1. Subsequently, the user may lower the piston 120 according to a capacity of the blood BF or bone marrow to locate and fix the piston 120 so that the piston sealing ring 125 may be close to the blood BF or bone marrow.

Subsequently, when centrifugation of the body fluid component separating device 10 is performed in a state in which the handle 131 is coupled, the blood BF or bone narrow may be divided into a layer including a first material M1 and a layer including a second material M2, and a layer including a third material M3 according to a specific gravity, and the layers may be formed from the bottom of the container 111. For example, the first material M1 may include red blood cells, the second material M2 may include platelet-rich plasma (PRP) and bone-marrow cell concentrate, and the third material M3 may include platelet-poor plasma, fats, or oils. In particular, the layer including the second material M2 may have a significantly less thickness than the layer including the first material M1 and the layer including the third material M3.

Figure 7:
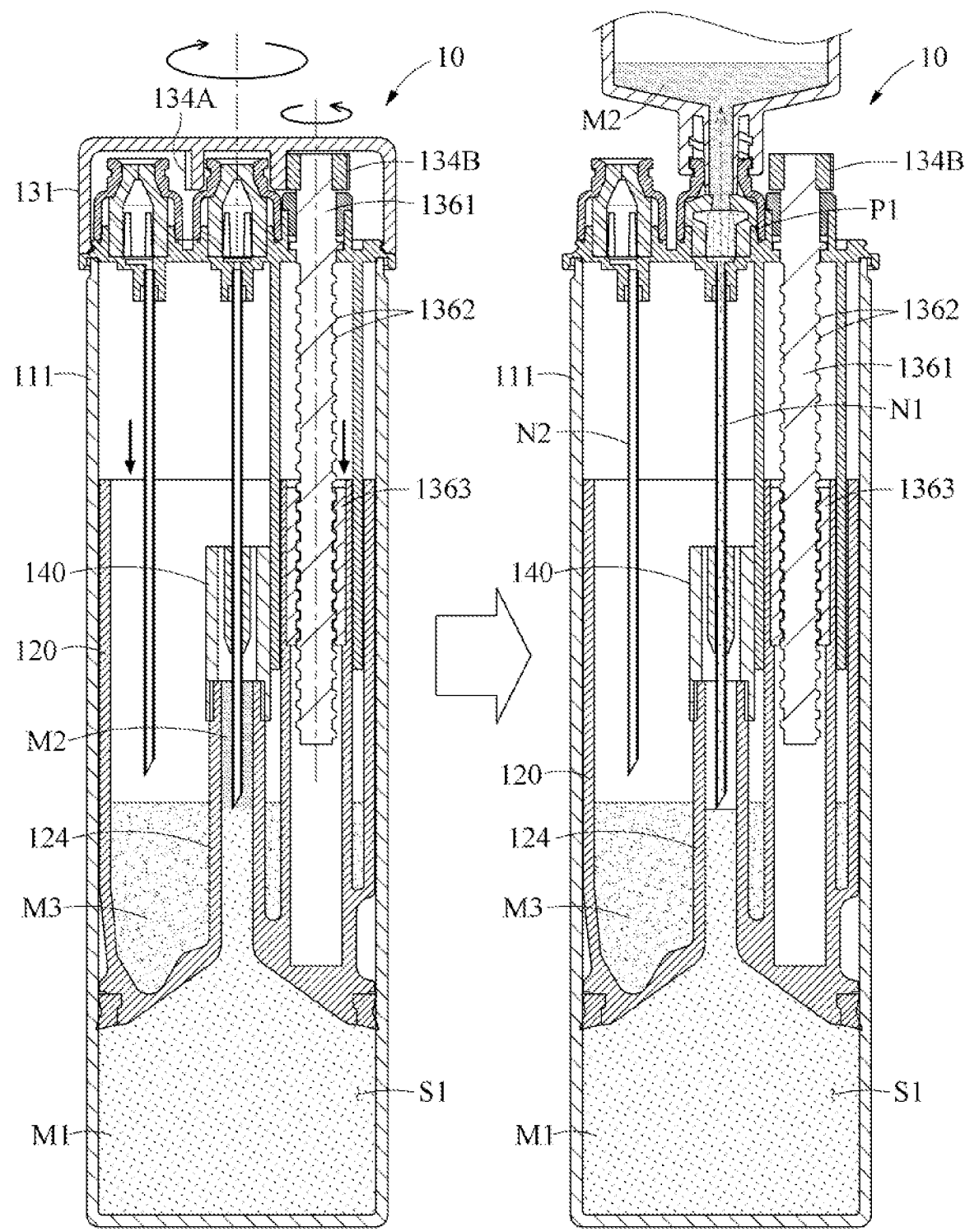

Referring to FIG. 7, if a user grips the handle 131 and rotates the handle 131, the first engagement member 134A may rotate together with the handle 131, and the second engagement member 134A engaged with the first engagement member 134A may rotate. In addition, the shaft 1361 connected to the second engagement member 134B may rotate and may be engaged with the male engagement element 1362 formed in the shaft 1361 to enable a movement by a predetermined pitch distance of the male engagement element 1362. Accordingly, the piston 120 on which the female engagement element 1363 is mounted may descend together with the female engagement element 1363 by the predetermined pitch distance. When the piston 120 descends, the volume of the first space S1 may decrease, and the volume of the second space S2 may increase by a magnitude corresponding to the decrease in the volume of the first space S1. As a result, the first space S1 and the second space S2 may form a pressure balance. Here, the third material M3 may move along the partition 123 and may flow through the fluid passage 124 and the main channel CH1 and the sub-channel CH2 of the indicator 140 so that the second space S2 may be filled. The second material M2 may move along the partition 123 and may flow into the fluid passage 124, so that the fluid passage 124 may be filled to a predetermined height of the fluid passage 124.

Subsequently, the user may remove the handle 131, and may extract the second material M2 out of the container 111 through the first needle N1 by coupling an extraction means to the first plug 114A. For example, the extraction means may include various mechanisms for extracting other materials, for example, a syringe that may be coupled to the first screw thread 114A-1 of the first plug 114A, and a pressure unit that applies a pressure from a front side to a back side of the syringe. Through this process, the first material M1 may be substantially mainly left in the first space S1, and a small amount of the second material M2 that is not extracted by the above extraction means may be present.

Here, to concentrate the second material M2 and minimize a loss of the second material M2, it may be desirable to extract the second material M2 in the following manner, instead of extracting the second material M2 in the above manner.

Figure 8:
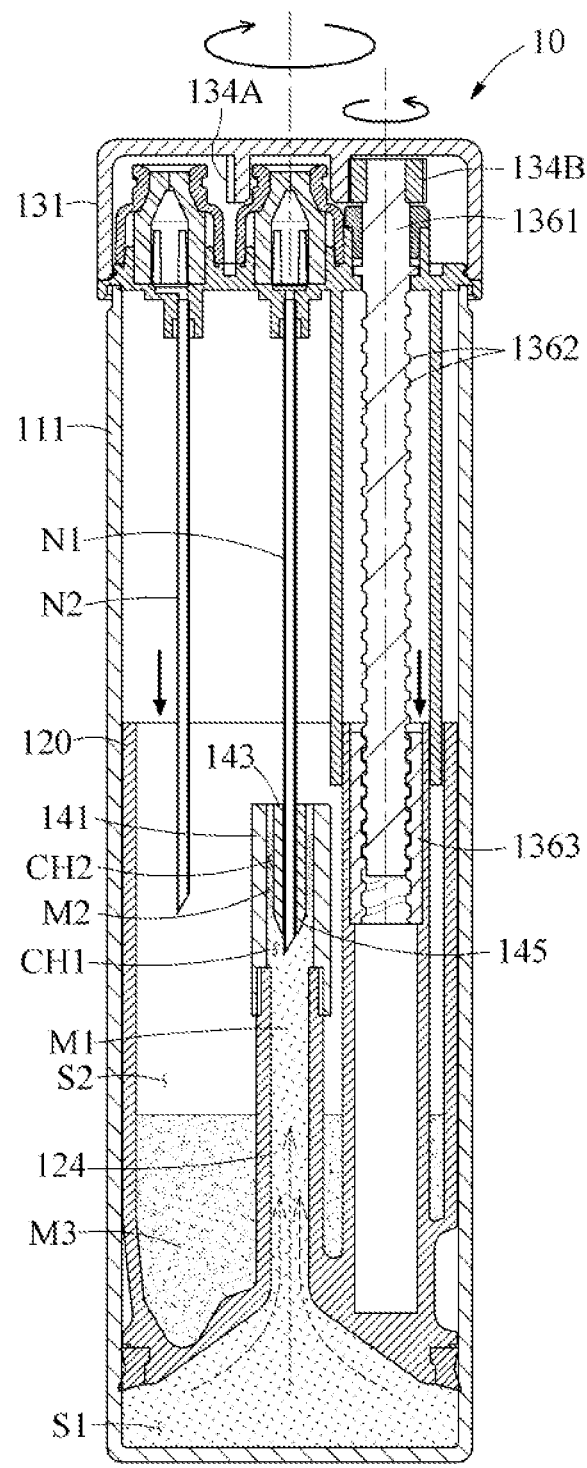

Referring to FIG. 8, if a user grips the handle 131 and rotates the handle 131, power may be transferred to the first engagement member 134A, the second engagement member 134B, the shaft 1361, the male engagement element 1362, the female engagement element 1363 and the piston 120, and the piston 120 may continue to descend. Accordingly, the second material M2 and the first material M1 in the first space S1 may be further forced to flow into the second space S2 through the fluid passage 124. In particular, when an extremely small amount of the second material M2 flows through the main channel CH1 of the tube 141 and enters the sub-channel CH2 defined by the tube 141 and the insert 143, the layer including the second material M2 may be spread along the sub-channel CH2 between the tube 141 and the insert 143. Accordingly, it may be understood that since the flow area of the sub-channel CH2 is less than the flow area of the main channel CH1, a flow length of the second material M2 flowing through the sub-channel CH2 is greater than a flow length of the second material M2 flowing through the main channel CH1. Based on the above scheme, the user may visually and easily determine whether the second material M2 is present in the sub-channel CH2, and an amount of the second material M2, thereby more clearly identifying a boundary between the second material M2 and the first material M1.

Figure 9:
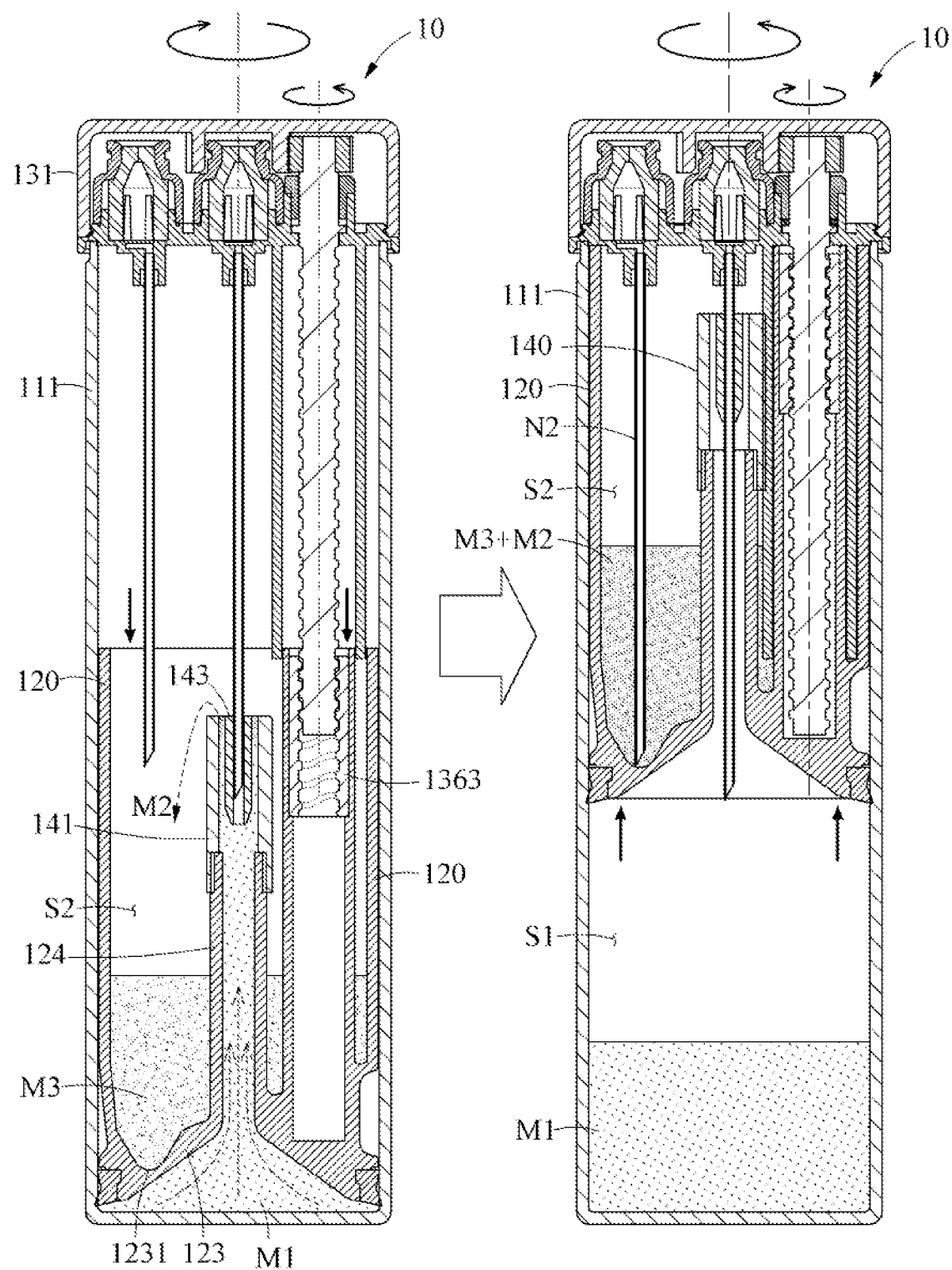

Referring to FIG. 9, a user may additionally rotate the handle 131 to further lower the piston 120. If the piston 120 is sufficiently lowered, in addition to the third material M3, the second material M2 present in the tube 141 and between the tube 141 and the insert 143 may enter the second space S2 through the outlet port of the tube 141. The second material M2 and the third material M3 entering the second space S2 may be accommodated in the groove 1231 and the second space S2 along the partition 123. Here, a state in which the second material M2 and the third material M3 are mixed in the groove 1231 and the second space S2 may be maintained. While monitoring flows of the second material M2 and the first material M1 through the sub-channel CH2 of the indicator 140, the user may stop the piston 120 at a position in which the first material M1 does not enter the second space S2 through the outlet port of the tube 141 to prevent the first material M1 from flowing into the second space S2 through the outlet port of the tube 141, and may raise the piston 120 enough to allow the second needle N2 to extract the second material M2 (to be accommodated in the groove 1231 by centrifugation) by rotating the handle 131 in an opposite direction. Subsequently, the user may perform additional centrifugation of the body fluid component separating device 10. Accordingly, due to a difference in the specific gravity, the layer including the second material M2 may be mainly formed in the groove 1231, and the layer including the third material M3 may be formed thereon.

Figure 10:
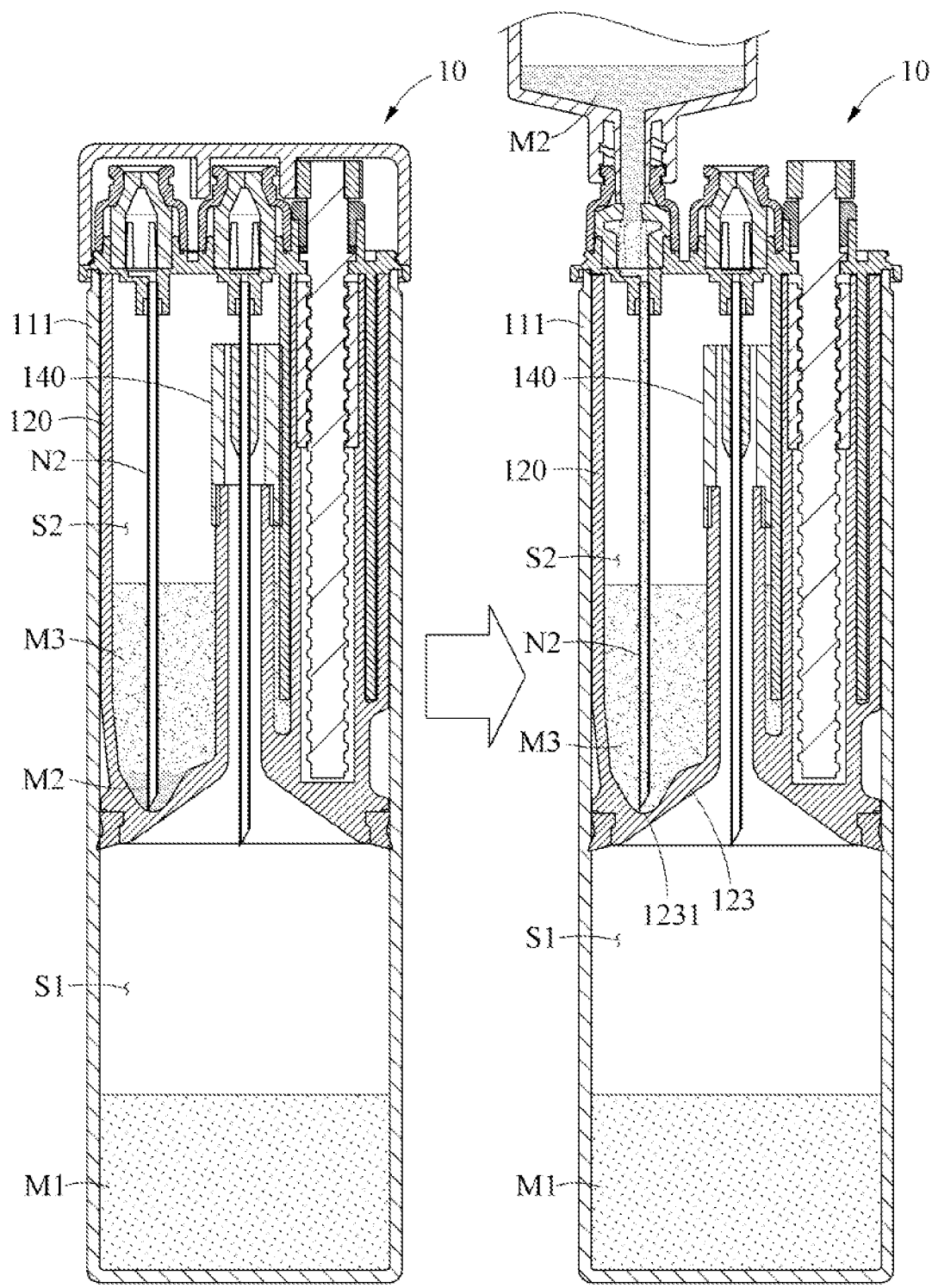
Figure 11:
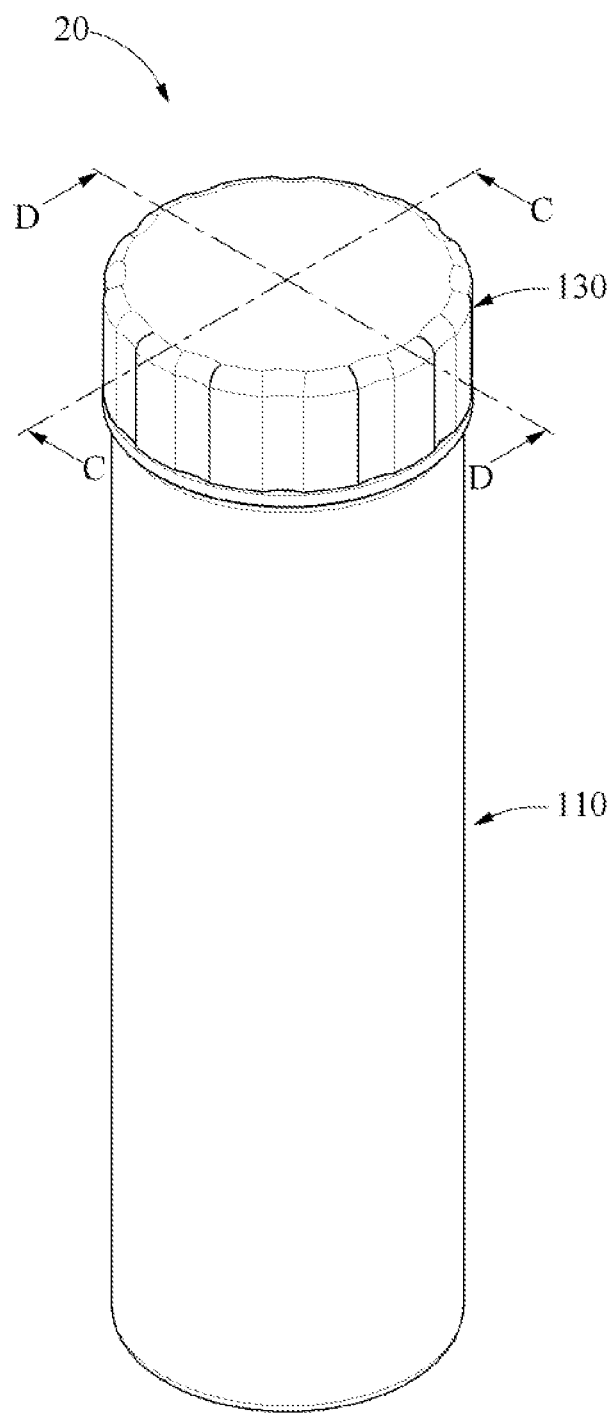
FIG. 11 is a perspective view of a body fluid component separating device according to a second example embodiment.
Figure 12:
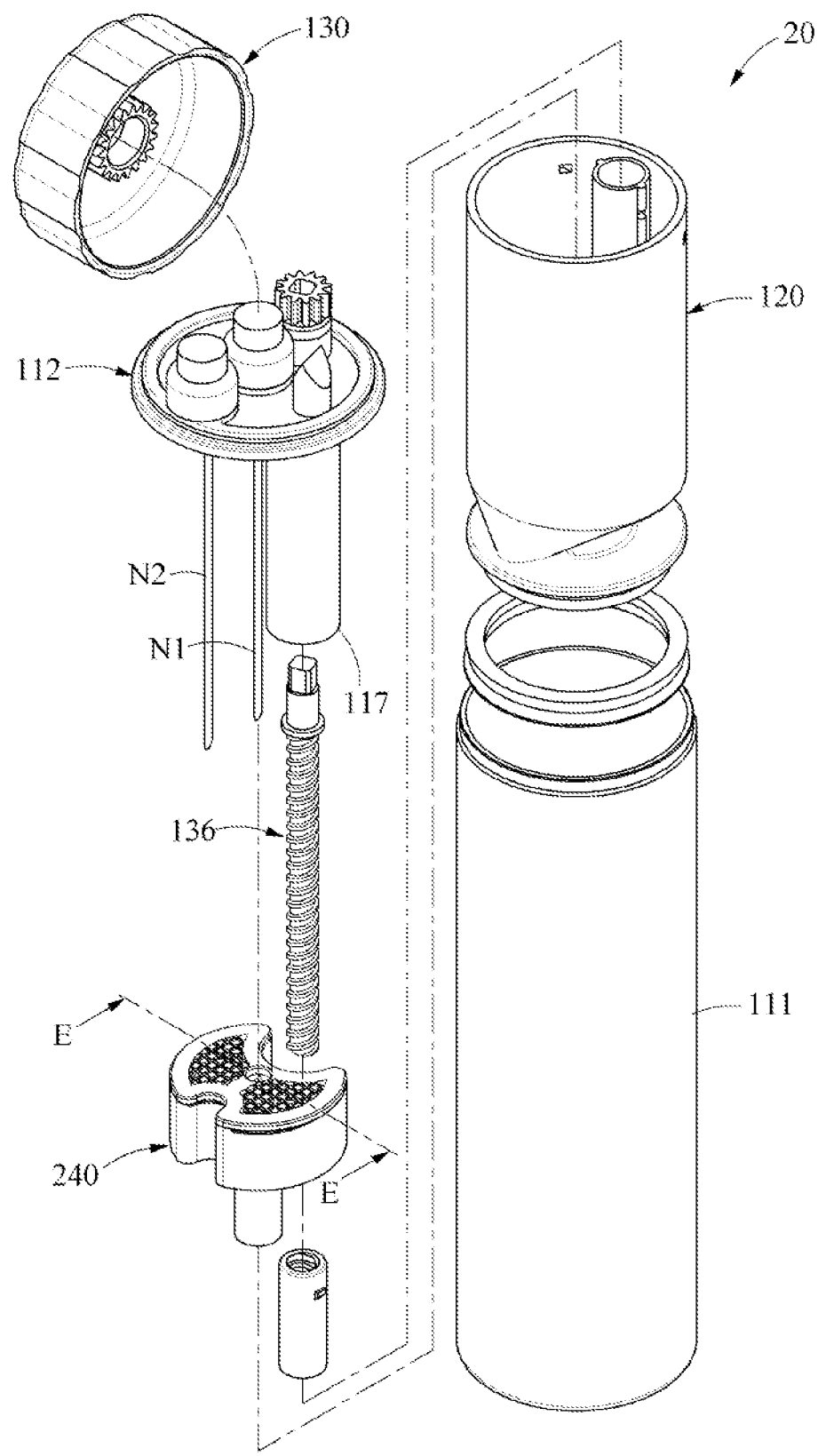
FIG. 12 is an exploded perspective view of the body fluid component separating device according to the second example embodiment.
Figure 13:
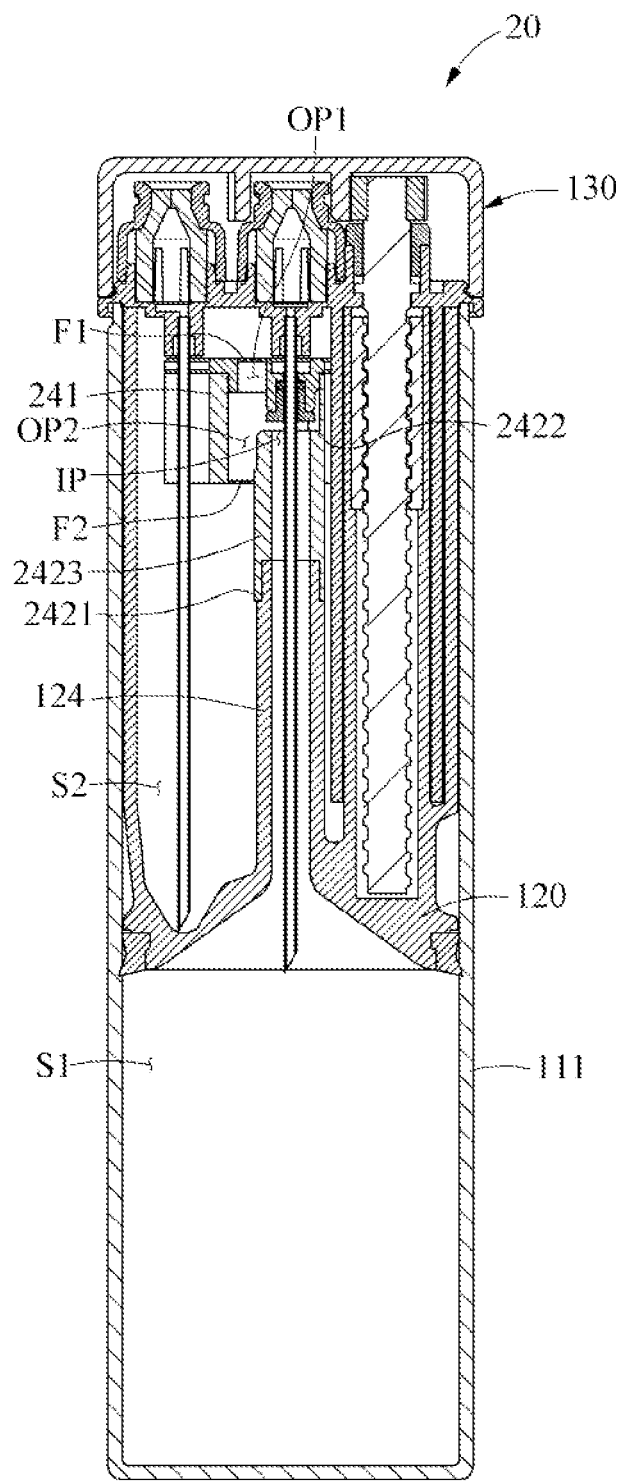
FIG. 13 is a cross-sectional view of the body fluid component separating device of FIG. 11, taken along line C-C.
Figure 14:
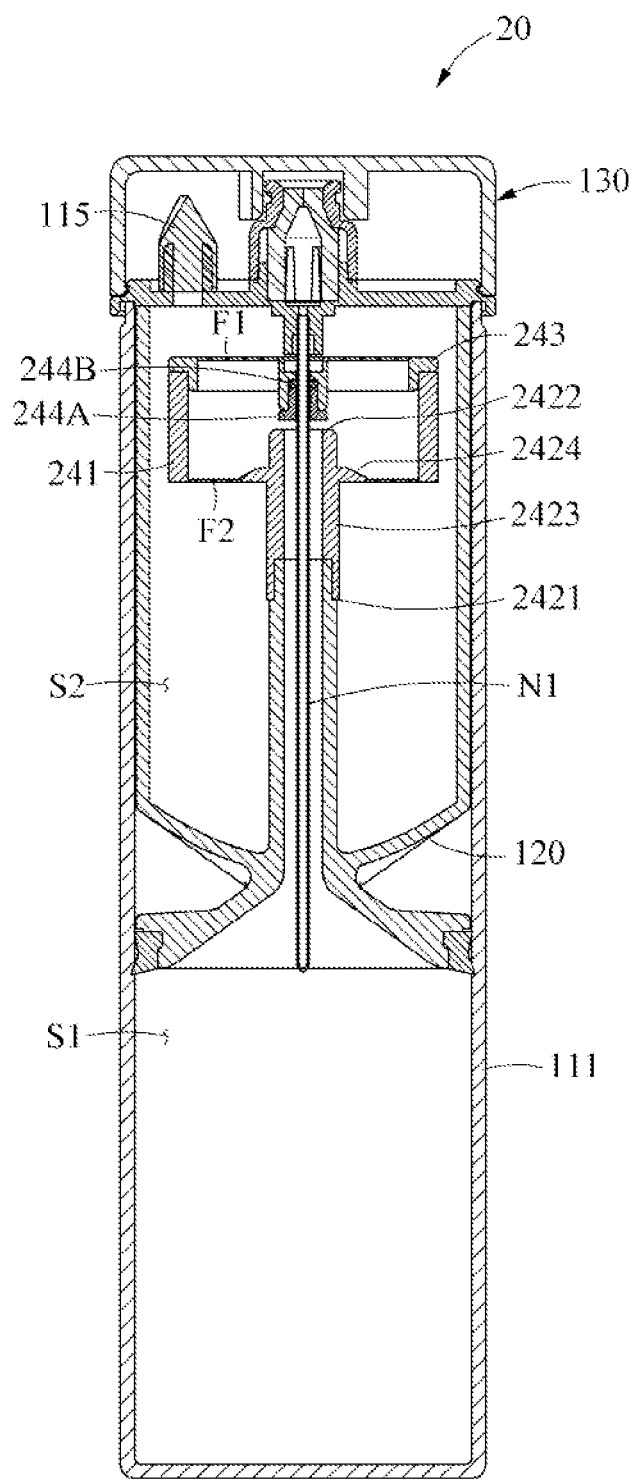
FIG. 14 is a cross-sectional view of the body fluid component separating device of FIG. 11, taken along line D-D.
Figure 15:
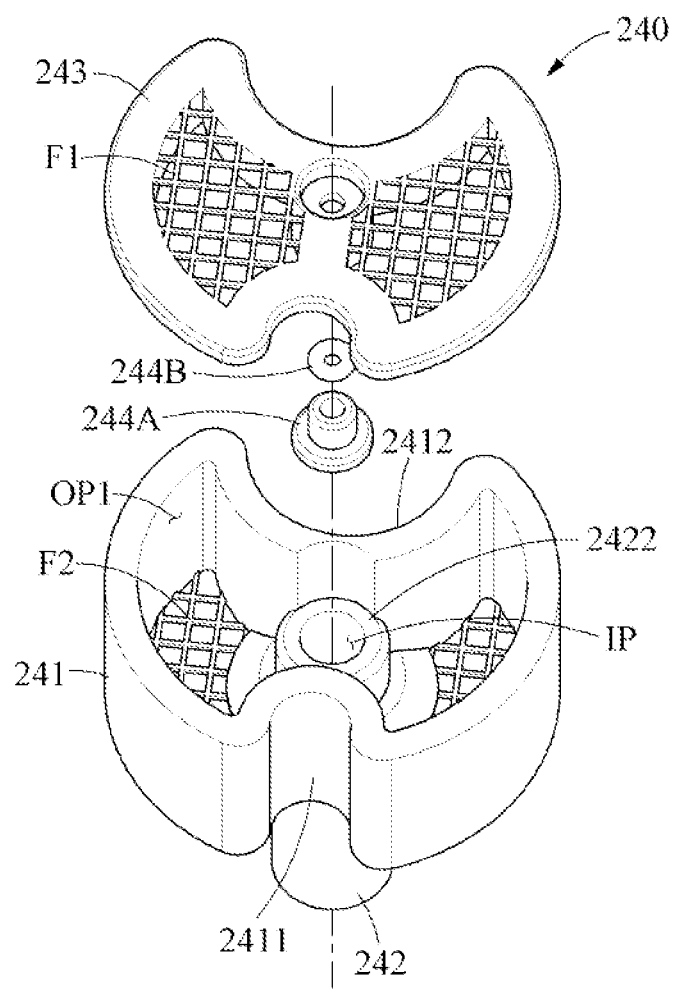
FIG. 15 is an exploded perspective view of a filter structure of the body fluid component separating device of FIG. 12.
Figure 16:
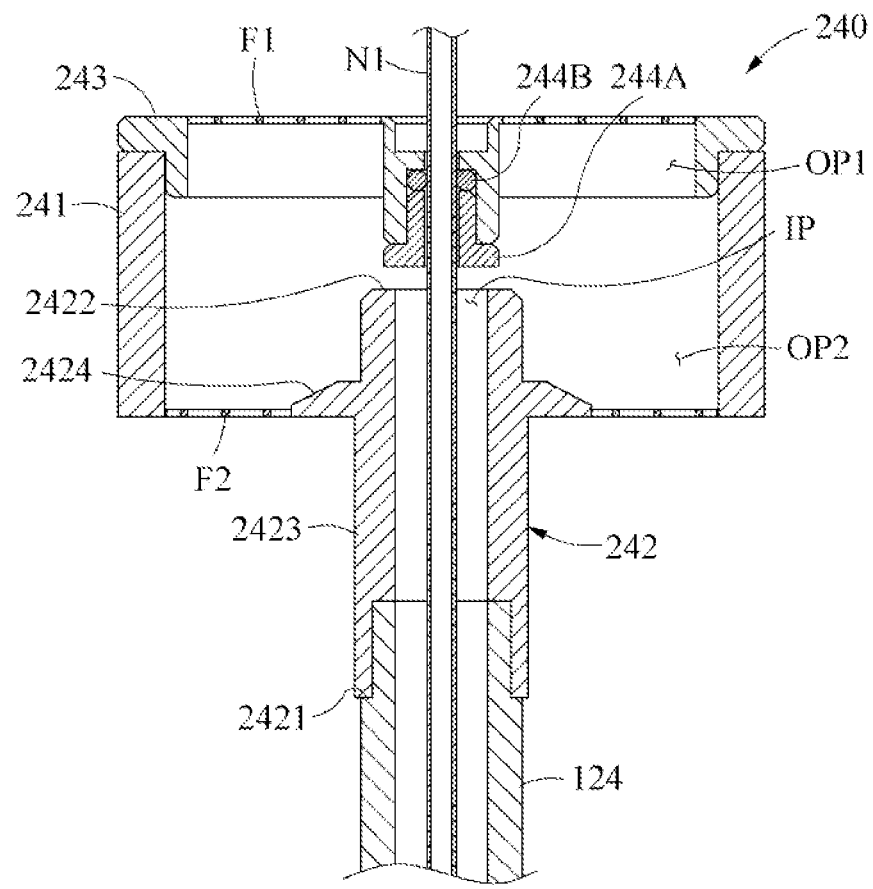
FIG. 16 is a cross-sectional view of the filter structure of the body fluid component separating device of FIG. 14.

Referring to FIG. 10, after the additional centrifugation, the user may remove the handle 131 (see FIG. 3), and use the extraction means as described above with reference to FIG. 7 to extract the second material M2 out of the container 111 through the second needle N2. In an example, the user may extract the second material M2 if necessary, or may extract the second material M2 together with a portion of the third material M3. In another example, the user may extract the third material M3 by lowering the piston to an appropriate position, and then extract the second material M2 by raising the piston 120.

Referring to FIGS. 11 to 16, a body fluid component separating device 20 according to an example embodiment may separate platelet-rich plasma (PRP) and bone-marrow cell concentrate (BMC) that are target materials from a target fluid to be separated, similarly to the body fluid component separating device 10 described above with reference to FIGS. 1 to 10. The body fluid component separating device 20 according to the present example embodiment may include a filter structure 240, instead of the indicator 140 of the body fluid component separating device 10 described with reference to FIGS. 1 to 10. Accordingly, unless otherwise described, the body fluid component separating device 20 will be described on the assumption that component(s) having the same reference numbers and sub-component(s) thereof have the same structures, functions, effects, and the like.

The filter structure 240 may fluidly connect a first space S1 and a second space S2 of a container 111 separated by a piston 120 and may filter a portion of materials in a fluid flowing from the first space S1 to the second space S2.

The filter structure 240 may include a filter housing 241, a first filter F1, a second filter F2, a tube 242, a filter cap 243, a sealing cap 244A, and a sealing ring 244B.

The filter housing 241 may form a space in which the fluid flowing from the first space S1 to the second space S2 stays. For example, the filter housing 241 may include an inlet port IP that fluidly communicates with the first space S1, a pair of outlet ports OP1 and OP2 that fluidly communicate with the second space S2, and a retention space between the inlet port IP and the pair of outlet ports OP1 and OP2. The pair of outlet ports OP1 and OP2 may be located opposite to each other with respect to a flow direction. It may be understood that a fluid passing through the filter housing 241 is divided into a first path leading from the inlet port IP to the first outlet port OP1 through the retention space and a second path leading from the inlet port IP to the second outlet port OP2 through the retention space.

The first filter F1 and the second filter F2 may filter a fluid flowing from the retention space of the filter housing 241 to the second space S2. In addition, the first filter F1 may be installed in the first outlet port OP1, and the second filter F2 may be installed in the second outlet port OP2. The first filter F1 and the second filter F2 may have a pore size suitable for passing platelet-rich plasma and bone-marrow cell concentrate to the second space S2 and blocking red blood cells. For example, the first filter F1 and the second filter F2 may be mesh filters.

In the filter housing 241, a central portion of the filter housing 241 may accommodate a first needle N1, a first side 2411 of the filter housing 241 may enclose a second needle N2, and a second side 2412 of the filter housing 241 opposite to the first side 2411 may enclose a piston guide 117. For example, the filter housing 241 may have an overall cylindrical shape. The first side 2411 and the second side 2412 may have a shape of a curved recess, and a radius of a curvature of the first side 2411 may be less than a radius of a curvature of this second side 2412.

The tube 242 may fluidly connect a fluid passage 124 and the filter housing 241. For example, the tube 242 may include a first end portion 2421 connected to a downstream portion of the fluid passage 124, a second end portion 2422 leading to the retention space of the filter housing 241 and connected to the inlet port IP of filter housing 241, and a longitudinal portion 2423 extending between the first end portion 2421 and the second end portion 2422. The first needle N1 may pass through the filter housing 241, the tube 242, and the fluid passage 124.

The second end portion 2422 of the tube 242 may protrude into the retention space of the filter housing 241. For example, the second end portion 2422 of the tube 242 may protrude from an inner wall of the filter housing 241. This may be advantageous in that a target material (e.g., platelet-rich plasma) flowing through the tube 242 and entering the retention space is visible to a user. In addition, the tube 242 may include a step 2424 formed between the second end portion 2422 of the tube 242 and the inner wall of the filter housing 241. A thickness of a portion of the step 2424 may vary in a direction from the inner wall of the filter housing 241 toward the second end portion 2422.

The filter cap 243 may accommodate the first filter F1. A cross section of the filter cap 243 may have the same shape as that of the filter housing 241. The filter cap 243 may be removably installed in the first outlet port OP1 of the filter housing 241. In addition, a central portion of the filter cap 243 may accommodate the first needle N1.

The sealing cap 244A and the sealing ring 244B may seal a coupling portion between the first needle N1 and the filter cap 243.

Hereinafter, an operation of the body fluid component separating device 20 will be described with reference to FIGS. 17 to 20. Components not shown in FIGS. 17 to 20 will be clearly understood from FIGS. 1 to 5 and 11 to 16. An operation method not described in FIGS. 17 to 20 overlaps a portion of an operation method of the body fluid component separating device 10 described above with reference to FIGS. 6 to 10, and accordingly further description thereof is not repeated herein.

Figure 17:
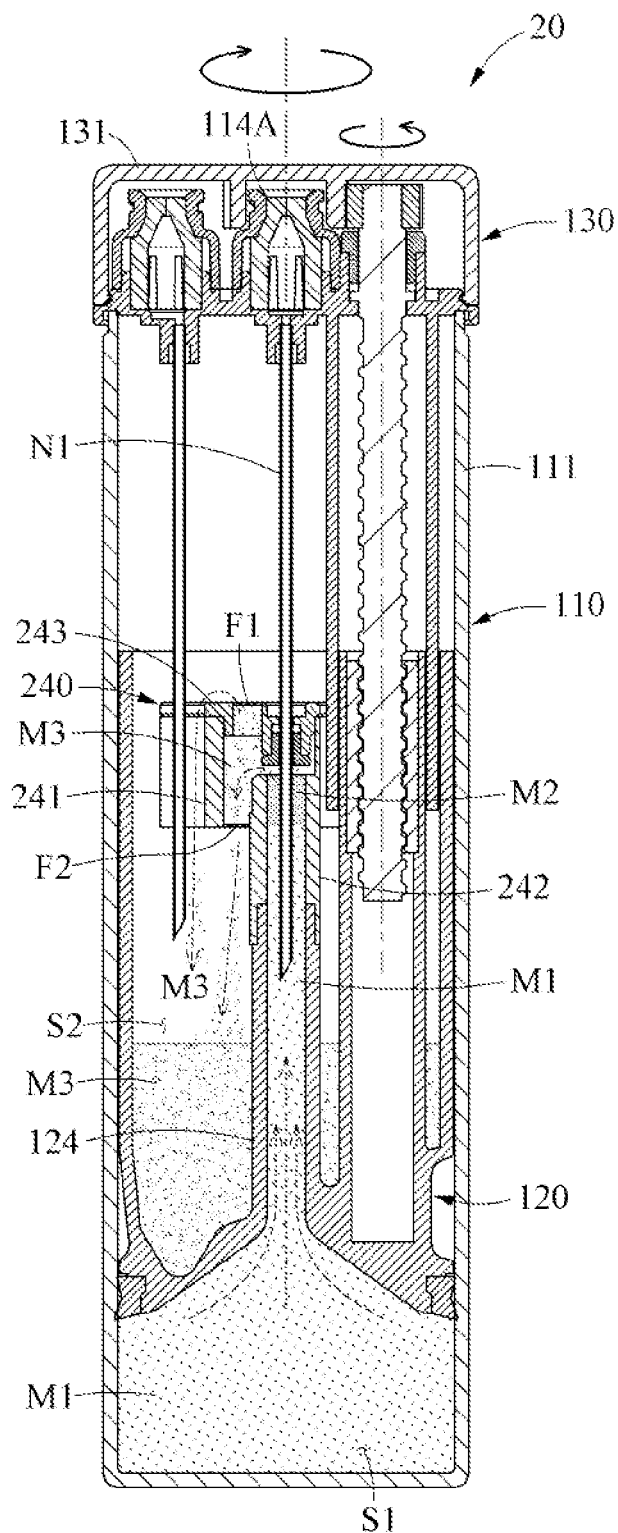
FIGS. 17 to 20 illustrate an operation of the body fluid component separating device according to the second example embodiment.

Referring to FIG. 17, if a user lowers the piston 120 by operating a manipulator 130, a third material M3, a second material M2, and a fast material M1 may sequentially flow along the fluid passage 124. In particular, the user may capture a point in time at which the second material M2 is about to pass from the tube 242 to the retention space of the filter housing 241, may remove a handle 131, and then may extract the second material M2 through the first needle N1 using the same extraction means as described above. Meanwhile, an extra second material M2 that is not extracted through the first needle N1 may enter the retention space of the filter housing 241.

Figure 18:
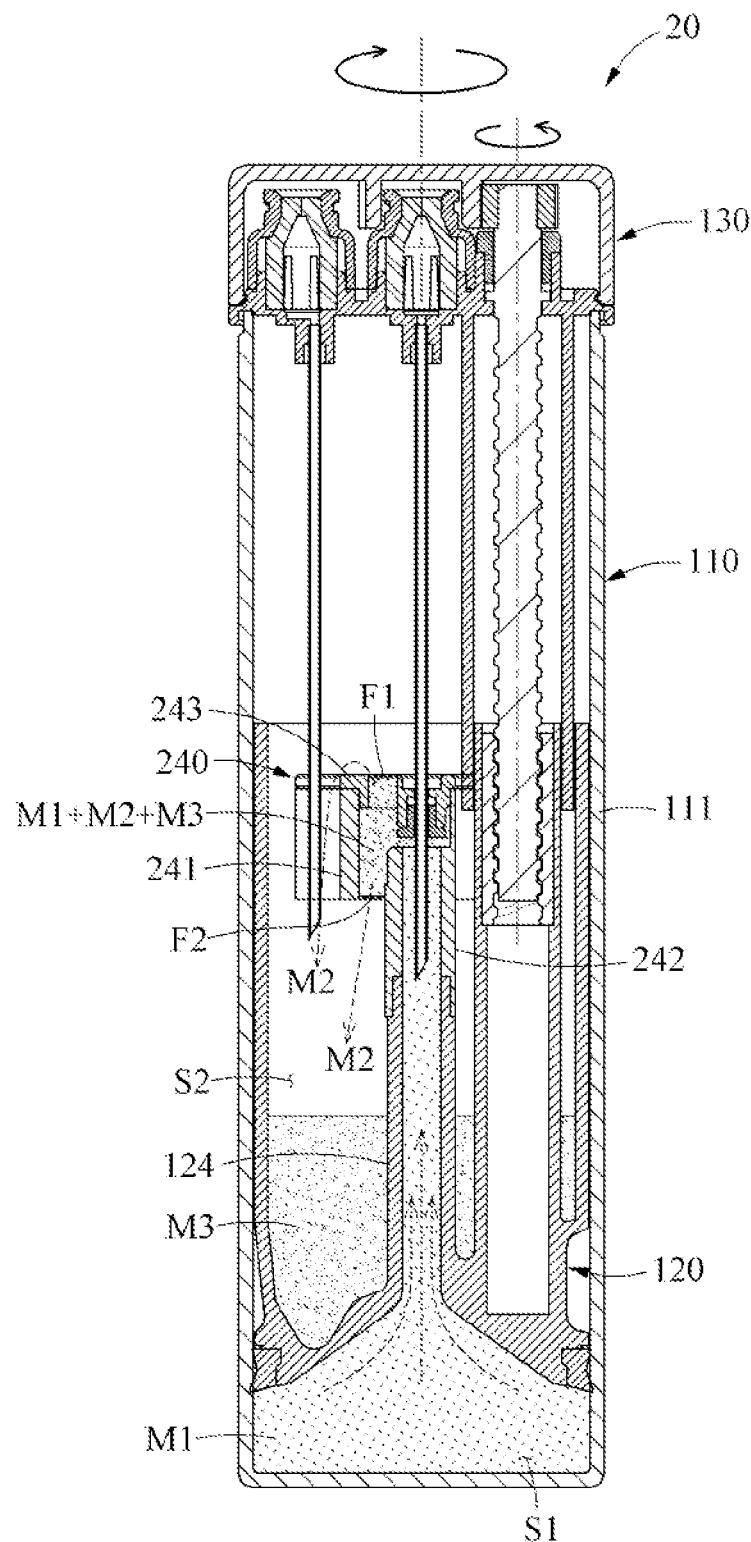

Referring to FIG. 18, a portion of the second material M2 and the third material M3 may be mixed in the retention space of the filter housing 241. If the piston continues to descend, a vacuum may be generated in the second space S2 to force a flow from the retention space of the filter housing 241 to the second space S2. Here, the first filter F1 and the second filter F2 may allow a flow of the second material M2 and the third material M3, but may block a flow of the first material M1. Accordingly, only the second material M2 and the third material M3 present in the retention space of the filter housing 241 may escape into the second space S2, and a portion of the remaining second material M2 and third material M3 may be released in a subsequent centrifugation process.

Figure 19:
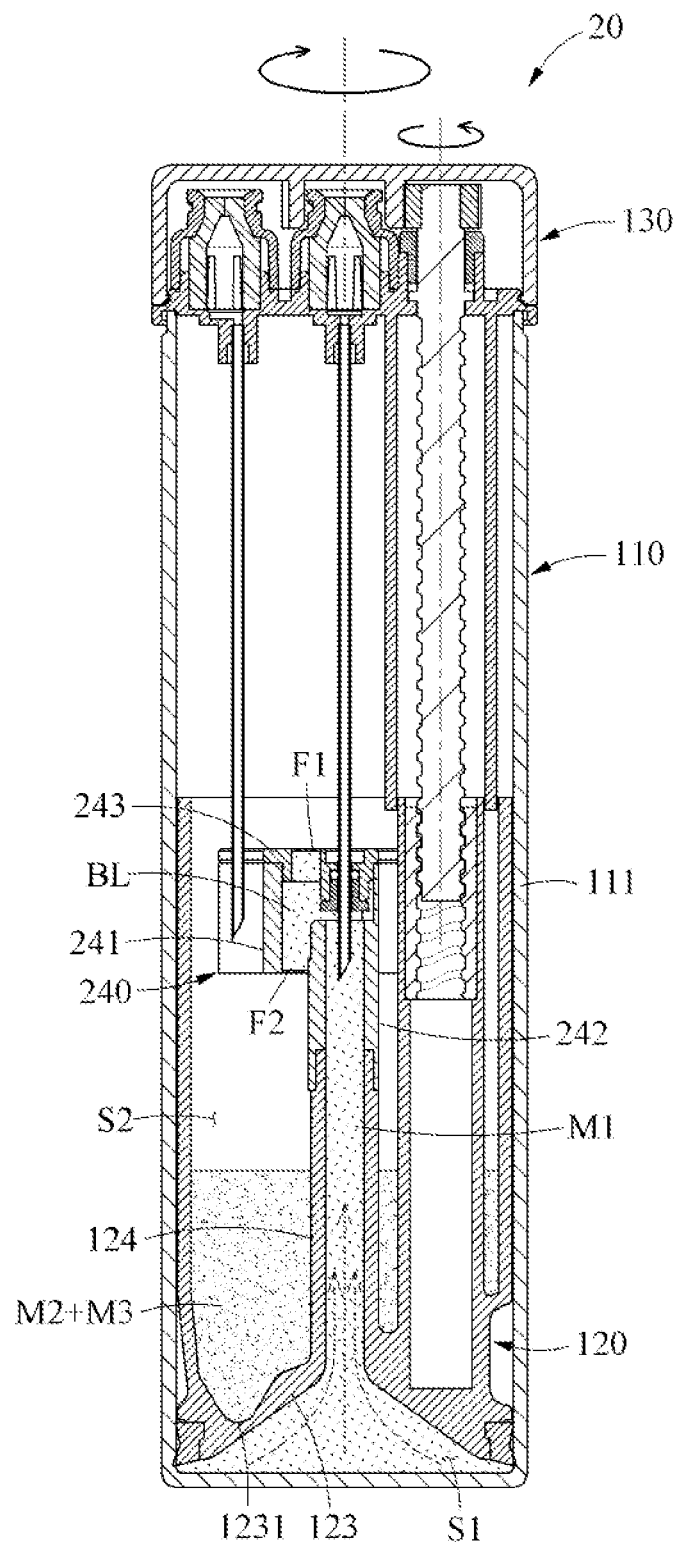

Referring to FIG. 19, the second material M2 and the third material M3 escaping into the second space S2 may be accommodated in a mixed state in a groove 1231 of the partition 123 and the second space 2S. Subsequently, a user may perform centrifugation of the body fluid component separating device 20. Accordingly, due to a difference in a specific gravity, a layer including the second material M2 may be mainly formed in the groove 1231 and a layer including the third material M3 may be formed thereon.

Figure 20:
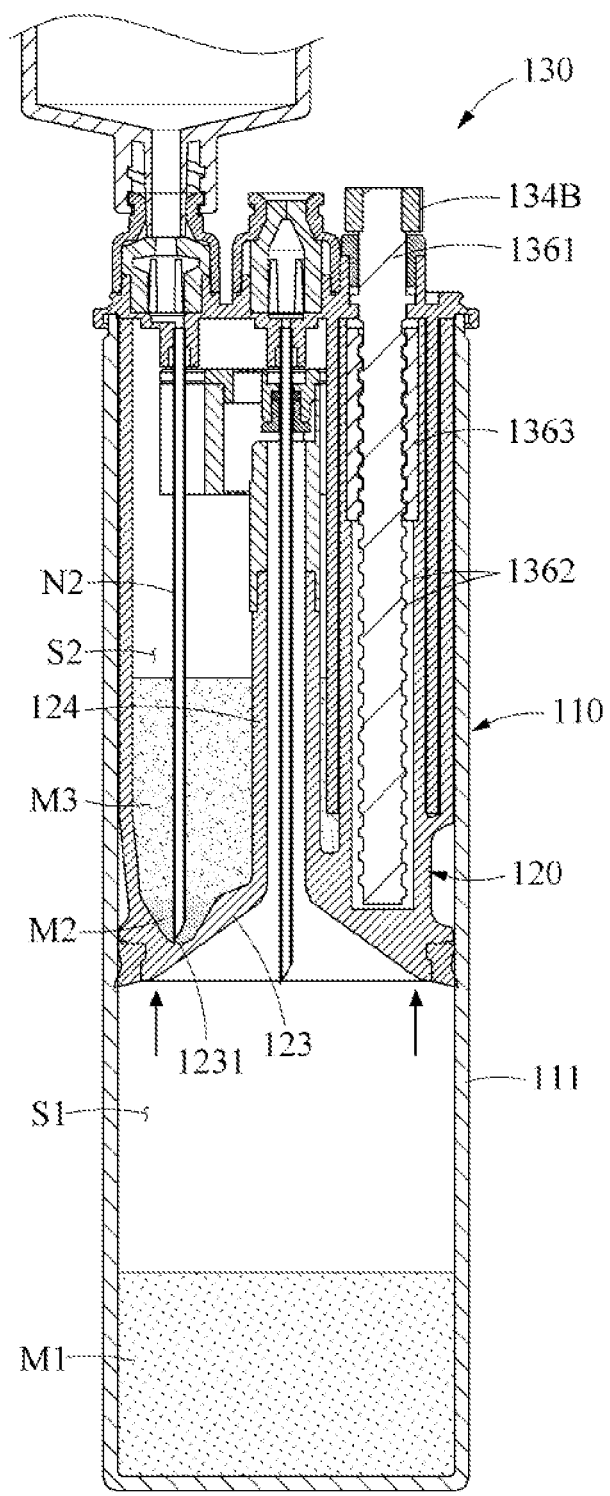

Referring to FIG. 20, a user may raise the piston 120 to extract the second material M2. If the piston 120 ascends enough to allow the second needle N2 to extract the second material M2 accommodated in the groove 1231, the user may remove the handle 131 (see FIG. 3), and may extract the second material M2 out of the container 111 through the second needle N2 using the same extraction means as described above. In an example, the user may extract the second material M2 if necessary, or may extract the second material M2 together with a portion of the third material M3. In another example, the user may extract the third material M3 by raising the piston to an appropriate position, and then extract the second material M2 by raising the piston 120.

Figure 21:
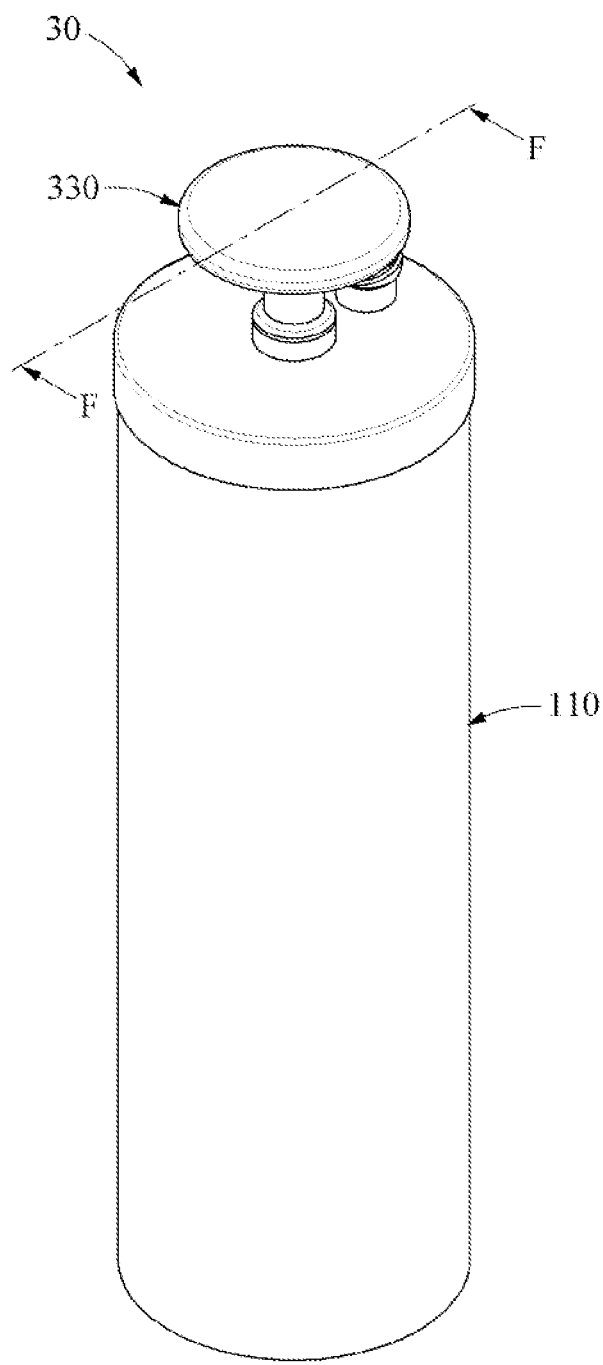
FIG. 21 is a perspective view of a body fluid component separating device according to a third example embodiment.
Figure 22:
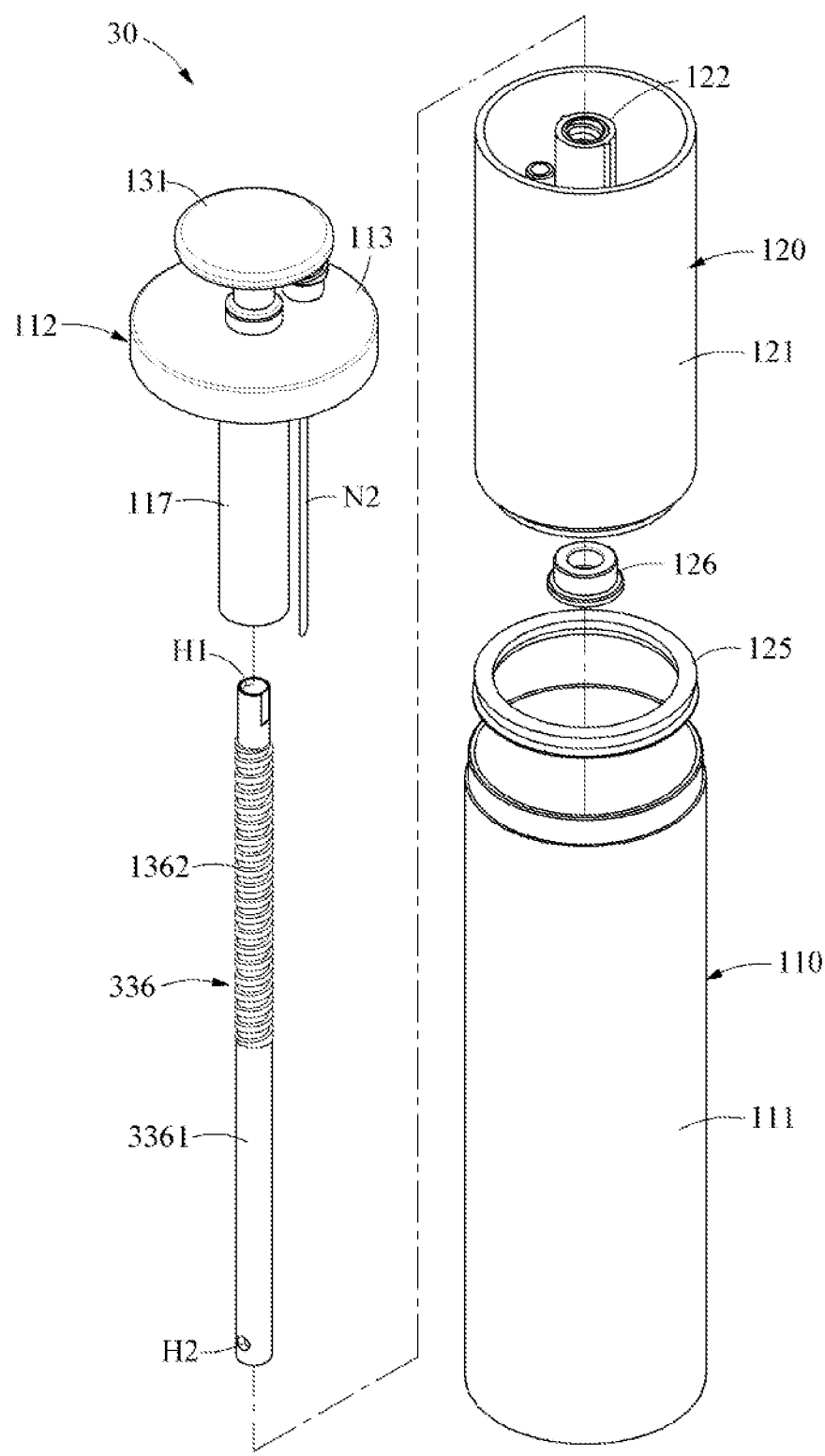
FIG. 22 is an exploded perspective view of the body fluid component separating device according to the third example embodiment.
Figure 23:
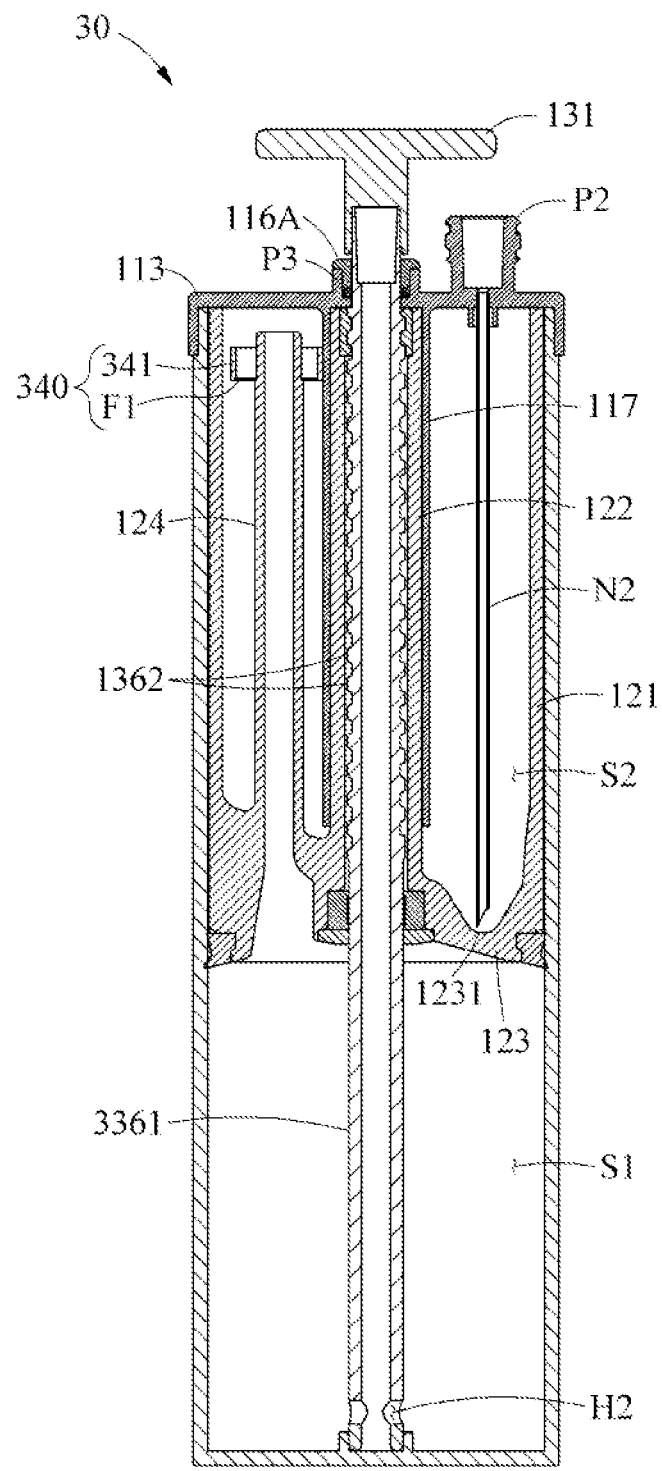
FIG. 23 is a cross-sectional view of the body fluid component separating device of FIG. 21, taken along line E-E.

Referring to FIGS. 21 to 23, a body fluid component separating device 30 according to an example embodiment may separate platelet-rich plasma (PRP) and bone-marrow cell concentrate (BMC) that are target materials from a target body fluid to be separated, similarly to the body fluid component separating devices 10 and 20 described above with reference to FIGS. 1 to 20. The body fluid component separating device 30 may include a manipulator 330 having a structure different from that of the manipulator 130 of the body fluid component separating devices 10 and 20 described with reference to FIGS. 1 to 20, and a feature structure 340 having a structure different from that of the filter structure 240 of the body fluid component separating device 20 described with reference to FIGS. 11 to 20. Unless otherwise described, a PRP separating device 30 will be described on the assumption that component(s) having the same reference numbers and subcomponent(s) thereof have the same structures, functions, effects, and the like.

The manipulator 330 may include an adjusting portion 336 configured to finely adjust a movement of a piston 120 and fix the piston 120 in place. The adjusting portion 336 may include a shaft 3361 on which a male engagement element 1362 is formed.

The shaft 3361 may have a tubular shape. Also, the male engagement element 1362 may be formed only on a portion of the shaft 3361 in a longitudinal direction of the shaft 3361. For example, the male engagement element 1362 may be formed only from an upper portion of the shaft 3361 to a central portion of the shaft 3361.

When the shaft 3361 is viewed in the longitudinal direction of the shaft 3361, the shaft 3361 may include a first opening H1 at a first end disposed in an upper portion, and a second opening H2 at a second end disposed in a lower portion. After removing a handle 131, a user may inject the target body fluid through the first opening H1, and the injected target body fluid may be accommodated in a first space S1 through the second opening H2 along an inner cavity of the shaft 3361.

The shaft 3361 may be disposed in a central portion of a container 111. Here, a piston guide 117 and an inner body 122 may also be located in the central portion of the container 111, and a fluid passage 124 may be located around the piston guide 117.

Meanwhile, the piston 120 may include an additional sealing ring 126 between the shaft 3361 and the inner body 122. The sealing ring 126 may be received in an inner recess of the inner body 122 to maintain a seal between the shaft 3361 and the inner body 122.

The filter structure 340 may include a filter housing 341 and a first filter F1. The filter housing 341 may substantially have a shape of a bowl, and an end portion of the fluid passage 124 may penetrate the filter housing 341. An upper portion of the filter housing 341 may be open to a second space S2, while a lower portion of the filter housing 341 may be fluidly connected to the second space S2 via the first filter F1. Accordingly, a target material (for example, platelet-rich plasma) of a body fluid passing through the fluid passage 124 accommodated in the filter housing 341 may flow into the second space S2 through the first filter F1 during centrifugation, and a specific material (for example, red blood cells) may be maintained in the filter housing 341 while being accommodated in the filter housing 341.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits are combined or coupled in different forms and modes than as described above or be substituted or switched with other components or equivalents.

Thus, other implementations, alternative embodiments and equivalents to the claimed subject matter are construed as being within the appended claims.

The invention claimed is:

1. A body fluid component separating device comprising:
    a housing comprising a container and a lid that define a space sealed against the outside;
    a piston configured to divide the sealed space of the housing into a first space and a second space and to fluidly connect the first space and the second space;
    a manipulator configured to adjust a movement of the piston between a first location in which the first space has a first volume and a second location in which the first space has a second volume different from the first volume, and configured to fix the piston at an arbitrary location between the first location and the second location, the manipulator being operably coupled to the piston; and
    a filter structure configured to fluidly connect the first space and the second space and to filter a fluid flowing from the first space to the second space,
    wherein the body fluid component separating device is configured to maintain the pressure balance between the first space and the second space such that when the piston descends, a pressure of the first space increases, and a pressure of the second space decreases regardless of an external force that causes the piston to move downward,
    wherein the manipulator comprises:
        a shaft having a longitudinal axis;
        a male engagement element formed on the shaft;
        a female engagement element engaged with the male engagement element and fixedly installed to the piston;
        a handle comprising a first engagement member; and
        a second engagement member connected to the shaft and engaged with the first engagement member,
    wherein when the manipulator is not operated by the male engagement element, the female engagement element, handle, and the second engagement member, the manipulator fixes a position of the piston with respect to the housing, and wherein the lid comprises a piston guide configured to guide a movement of the piston, and
    wherein the filter structure comprises:
        a filter housing having an inlet port fluidly connected to the first space, a first outlet port fluidly connected to the second space, and a second outlet port fluidly connected to the second space and disposed opposite the first outlet port;
        a first filter installed in the first outlet port; and
        a second filter installed in the second outlet port.

2. The body fluid component separating device of claim 1, further comprising:
    an indicator configured to fluidly connect the first space and the second space and to indicate a layer including a target material flowing from the first space to the second space.

3. The body fluid component separating device of claim 2, wherein the indicator comprises:
    a tube comprising an inlet port, an outlet port, and a main channel defined between the inlet port and the outlet port; and
    an insert disposed inside the tube and on the main channel, and configured to define a sub-channel having a cross section less than a cross section of the main channel together with the tube.

4. The body fluid component separating device of claim 3, wherein the insert comprises a guide portion to guide a fluid flowing through the main channel to the sub-channel.

5. The body fluid component separating device of claim 1, wherein
    the filter structure comprises a tube that includes a first end portion fluidly connected to the first space, a second end portion fluidly connected to the inlet port of the filter housing, and a longitudinal portion extending between the first end portion and the second end portion, and
    the second end portion of the tube protrudes from an inner wall of the filter housing toward an inside of the filter housing.

6. The body fluid component separating device of claim 1, wherein the piston comprises:
    an outer body moving along the housing;
    an inner body located inside the outer body;
    a partition configured to connect an end portion of the outer body and an end portion of the inner body and configured to partition an interior of the housing into the first space and the second space; and
    a fluid passage extending between the outer body and the inner body and from the partition and configured to fluidly connect the first space and the second space.

7. The body fluid component separating device of claim 6, wherein the partition comprises a groove to receive a target material.

* * * * *